US008538159B2

(12) United States Patent
Lu

(10) Patent No.: US 8,538,159 B2
(45) Date of Patent: Sep. 17, 2013

(54) METHOD AND APPARATUS FOR REAL-TIME/ON-LINE PERFORMING OF MULTI VIEW MULTIMEDIA APPLICATIONS

(75) Inventor: Jiangbo Lu, Leuven (BE)

(73) Assignees: IMEC, Leuven (BE); Katholieke Universiteit Leuven, Leuven (BE)

( * ) Notice: Subject to any disclaimer, the term of this patent is extended or adjusted under 35 U.S.C. 154(b) by 783 days.

(21) Appl. No.: 12/608,927

(22) Filed: Oct. 29, 2009

(65) Prior Publication Data

US 2010/0142824 A1 Jun. 10, 2010

Related U.S. Application Data

(63) Continuation of application No. PCT/BE2008/000036, filed on May 5, 2008.

(30) Foreign Application Priority Data

May 4, 2007 (GB) .................................. 0708676.2

(51) Int. Cl.
*G06K 9/46* (2006.01)
(52) U.S. Cl.
USPC ............ 382/195; 382/154; 382/275; 382/299
(58) Field of Classification Search
USPC .................. 382/154, 195, 275, 299
See application file for complete search history.

(56) References Cited

U.S. PATENT DOCUMENTS

| 6,862,035 | B2 * | 3/2005 | Jeong et al. ..................... 348/42 |
| 7,444,013 | B2 * | 10/2008 | Chen ............................. 382/154 |
| 7,512,262 | B2 * | 3/2009 | Criminisi et al. ............. 382/154 |
| 7,545,974 | B2 * | 6/2009 | Jeong et al. ................... 382/154 |
| 7,570,804 | B2 * | 8/2009 | Kim et al. ..................... 382/154 |
| 7,602,966 | B2 * | 10/2009 | Liu et al. ....................... 382/154 |
| 2001/0013895 | A1 * | 8/2001 | Aizawa et al. ................ 348/222 |
| 2005/0207630 | A1 * | 9/2005 | Chan et al. .................... 382/131 |
| 2005/0286756 | A1 * | 12/2005 | Hong et al. ................... 382/154 |
| 2006/0120594 | A1 * | 6/2006 | Kim et al. ..................... 382/154 |
| 2006/0193509 | A1 * | 8/2006 | Criminisi et al. ............. 382/154 |
| 2007/0222864 | A1 * | 9/2007 | Hiraga et al. ............... 348/208.4 |
| 2008/0170803 | A1 * | 7/2008 | Forutanpour ................. 382/284 |
| 2009/0080805 | A1 * | 3/2009 | Tanaka et al. ................. 382/299 |
| 2010/0142824 | A1 * | 6/2010 | Lu ................................. 382/195 |

OTHER PUBLICATIONS

Written Opinion of the International Searching Authority and International Search Report dated Dec. 12, 2008 for PCT/BE2008/000036.

(Continued)

*Primary Examiner* — Gregory M Desire
(74) *Attorney, Agent, or Firm* — Knobbe Martens Olson & Bear LLP

(57) ABSTRACT

A method and apparatus for real-time/on-line performing of multi-view multimedia applications are disclosed. In one aspect, a method of computing a disparity value of a pixel includes computing from two input images a plurality of first costs for a pixel, each cost associated with a region selected from a plurality of regions a first type, the regions covering the pixel and being substantially equal in size and shape. The method also includes computing from the first costs a plurality of second costs each associated with a region selected from a plurality of regions of a second type, the regions of the second type covering the pixel, at least some of the regions of the second type having a substantially different size and/or shape. The method further includes selecting from the second costs the minimal cost and selecting the corresponding disparity value as the disparity value.

20 Claims, 7 Drawing Sheets

(56) References Cited

OTHER PUBLICATIONS

Bakker et al., Edge preserving orientation adaptive filtering, 1999 IEEE Computer Society Conference on Computer Vision and Pattern Recognition (CVPR'99), Colorado, USA, Jun. 23-25, 1999, vol. 1, pp. 535-540.

Fusiello, et al., Efficient Stereo with Multiple Windowing, Proceedings of IEEE Computer Society Conference on Computer Vision and Pattern Recognition, San Juan, Puerto Rico, Jun. 17-19, 1997, pp. 858-863.

Lu, et al., Fast Variable Center-Biased Windowing for High-Speed Stereo on Programmable Graphics Hardware, IEEE International Conference on Image Processing, Sep. 1, 2007, pp. VI-568-571.

Lu et al., High-Speed Dense Stereo via Directional Center-Biased Windows on Graphics Hardware, IEEE 3DTV Conference, May 7-9, 2007, pp. 1-4.

Lu et al., High-Speed Stream-Centric Dense Stereo and View Synthesis on Graphics Hardware, IEEE $9^{th}$ Workshop on Multimedia Signal Processing, New Jersey, USA, Oct. 1, 2007, pp. 243-246.

Lu et al., Real-Time Stereo Correspondence Using a Truncated Separable Laplacian Kernal Approximation on Graphics Hardware, IEEE International Conference on Multimedia and Expo, Jul. 1, 2007, pp. 1946-1949.

Scharstein et al., A Taxonomy and Evaluation of Dense Two-Frame Stereo Correspondence Algorithms, Proceedings of the IEEE Workshop on Stereo and Multi-Based Vision, Dec. 9-10, 2001, IEEE Computer Society, California, USA, pp. 131-140.

Veksler, Olga, Fast Variable Window for Stereo Correspondence using Integral Images, Proceedings of the 2003 IEEE Computer Society Conference on Computer Vision and Pattern Recognition, New Jersey, USA, vol. 1, Jun. 18, 2003, pp. 556-561.

H. Shum, S.-C. Chan, and S.B. Kang, Image-based rendering, Rendering Dynamic Scenes. New York, Springer-Verlag, 2006, pp. 45-70.

C.L. Zitnick, S.B. Kang, M. Uyttendaele, S. Winder, and R. Szeliski, "High-quality video interpolation using a layered representation," in Proc. of SIGGRAPH'04, Los Angeles, CA, Aug. 2004, pp. 600-608.

C.L. Zitnick and S.B. Kang, "Stereo for image-based rendering using image over-segmentation." Int'l Journal of Computer Vision, vol. 75(1), pp. 49-65, Oct. 2007.

R. Yang, G. Welch, and G. Bisop, "Real-time consensus-based stereo reconstruction using commodity graphics hardware." In Proc. of Pacific Graphics, Beijing, China, Oct. 2002, pp. 225-234.

K.J. Yoon and I. S. Kweon, "Adaptive support-weight approach for correspondence search," IEEE Trans. Pattern Anal. March. Intell., vol. 28, No. 4, pp. 650-656, Apr. 2006.

R. Yang and M. Pollefeys, "Multi-resolution real-time stereo on commodity graphics hardware," in Proc. Of Conference on Computer Vision and Pattern Recognition, 2003, pp. 211-218.

R. Yang, M. Pollefeys, and S. Li, "Improved real-time stereo on commodity graphics hardware," in Proc. of CVPRW, Jun. 2004.

M. Gong and R. Yang, "Image-gradient-guided real-time stereo on graphics hardware," in Proc. of 3DIM, Ottawa, Jun. 2005, pp. 548-555.

L. Wang, M. Liao, M. Gong, R. Yang and D. Nister, "High-quality real-time stereo using adaptive cost aggregation and dynamic programming," in Proc. of 3DPVT, 2006.

R. Szeliski, "Prediction error as a quality metric for motion and stereo," in ICCV, 1999, pp. 781-788.

A. Fitzgibbon, Y. Wexler, and A. Zisserman, "Image-based rendering using image-based priors." In ICCV, 2003, pp. 1176-1183.

I. Geys, T.P. Koninckx, and L.V. Gool, "Fast interpolated cameras by combining a GPU based plane sweep with a max-flow regularization algorithm," in Proc. of 3DPVT, Greece, Sep. 2004, pp. 534-541.

M.D. McCool, "Signal processing and general-purpose computing on GPUs," IEEE Signal Process. Mag., vol. 24, pp. 109-114, 2007.

J.D. Owens, D. Luebke, N. Govindaraju, M. Harris, J. Krüger, A. E. Lefohn, and T. J. Purcell, "A survey of general-purpose computation on graphics hardware," Computer Graphics Forum, vol. 26, No. 1, pp. 80-113, 2007.

S. Rogmans, J. Lu, and G. Lafruit, "A scalable end-to-end optimized real-time image-based rendering framework on graphics hardware," in Proc. 3DTV Conference, 2008.

X. Huang and E. Dubois, "Disparity estimation for the intermediate view interpolation of stereoscopic images," in ICASSP, 2005, pp. 881-884.

A. Mancini and J. Konrad, "Robust quadtree-based disparity estimation for the reconstruction of intermediate stereoscopic images," in Proc. of SPIE Stereoscopic Displays and Virtual Reality Systems, vol. 3295, 1998, pp. 53-64.

H. Hirschmuller, P. Innocent, and J. Garibaldi, "Real-time correlation-based stereo vision with reduced border errors," Int. Journal of Computer Vision, vol. 47, pp. 229-246, 2002.

D. Scharstein, "Stereo vision for view synthesis," in CVPR, 1996, pp. 852-858.

J. Sun, Y. Li, and S.B. Kang, "Symmetric stereo matching for occlusion handling," in CVPR (2), 2005, pp. 399-406.

Middlebury stereo vision page. http://www.middlebury.edu/stereo.

S.H. Lee, Y. Kanatsugu, and J.-I. Park, "MAP-based stochastic diffusion for stereo matching and line fields estimation," Int. Journal of Computer Vision, vol. 47, pp. 195-218, 2002.

L. Wang, M. Gong, and R. Yang, "How far can we go with local optimization in real-time stereo matching," in Proc. of 3DPVT, 2006.

L. Zhang, "Fast stereo matching algorithm for intermediate view reconstruction of stereoscopic television images," IEEE Trans. Circuits Syst. Video Technol., vol. 16, pp. 1259-1270, 2006.

\* cited by examiner

METHOD AND APPARATUS FOR REAL-TIME/ON-LINE PERFORMING OF MULTI VIEW MULTIMEDIA APPLICATIONS

CROSS REFERENCE TO RELATED APPLICATIONS

This application is a continuation of PCT Application No. PCT/BE2008/000036, filed May 5, 2008, which is incorporated by reference hereby in its entirety.

BACKGROUND OF THE INVENTION

1. Field of the Invention

The invention relates to methods and apparatus for multimedia applications, in particular multimedia applications so tuned for enhancing execution thereof on a graphics processing unit (GPU) or on any other "control-limited" architecture (or even an application-specific integrated circuit (ASIC)).

2. Description of the Related Technology

Over the past years, many research efforts have been made to tackle interactive synthesizing any desired novel view between relatively sparse camera viewpoints with various image-based rendering (IBR) techniques [1]. Among them, rendering a scene with associated depth maps is often favored for a practical system, because this image synthesis paradigm can lead to high-quality intermediate images [2, 3], and real-time 3D scene acquisition and view synthesis [4]. However, a real-time IBR system that can synthesize any intermediate view at visually plausible quality is not reported. For instance, the advanced disparity estimation methods [2, 3] are completely performed offline, while the simple real-time correlation approach [4] severely compromises the synthesized image quality.

Stereo matching, as an important early vision topic, has attracted intensive research interests for decades. A substantial amount of work has been done on stereo correspondence, which is systematically surveyed and evaluated by Scharstein and Szeliski [5]. In general, casting a stereo problem as a global optimization problem usually leads to high quality disparity estimation results, but most of these global techniques are too computationally expensive for online processing. Real-time stereo applications today still largely rely on local stereo methods together with a winner-takes-all (WTA) strategy.

Typically, local stereo approaches choose to aggregate the matching cost over a given support window to increase the robustness to image noise and insufficient (or repetitive) texture. The well-known challenge for area-based local stereo methods is that a local support window should be large enough to include enough intensity variation for reliable matching, while it should be small enough to avoid disparity variation inside the window. Therefore, to obtain accurate disparity results at depth discontinuities as well as on homogeneous regions, an appropriate support window for each pixel should be decided adaptively. Among the previous local stereo methods, Fusiello et al. [6] performed the correlation with nine square windows anchored at different points and retained the disparity with the smallest matching cost. However, this method and its generalized technique, i.e., shiftable windows [5], fail to produce good disparity estimation results for different image regions, because of their fixed-sized windows in constant shapes. Veksler [7] instead found a useful range of window sizes and shapes to explore while evaluating the window cost, which works well for comparing windows of different sizes. However, this variable window approach cannot achieve real-time speed yet, due to the large number of candidate support windows and also the costly matching cost update for each pixel. Recently, Yoon and Kweon [8] proposed a state-of-the-art local window method yet at a very demanding computational cost, where pixel-wise adaptive support-weights are defined using Laplacian kernels, and they modeled the unequal importance of each support pixel.

To meet the requirement of real-time stereo estimation, solely resorting to local stereo methods is not a guarantee. In fact, until recently software-only real-time stereo systems begin to emerge, which exploit assembly level instruction optimization using Intel's MMX extension, but few CPU cycles are left to perform other tasks including high-level interpretation of the stereo results. Harnessing some powerful built-in functionalities of the modern graphics processing unit (GPU), Yang et al. first proposed a pyramid-shaped correlation kernel [9] and small-scale adaptive support windows [10]. GPU's are "streaming architectures" through which data should flow regularly with as little control as possible, and that it is recommended to use some "simple" operations (e.g. box filtering) to fully benefit from the GPUs performance. Having "variable" parameters that constantly change is not recommended in such architectures, because it causes a severe performance penalty. Though very impressive disparity estimation throughput was obtained on GPUs, these techniques cannot strike an optimal quality balance between homogeneous and heterogeneous regions. Later, Gong and Yang [11] proposed an image-gradient-guided correlation method with improved accuracy, while still maintaining real-time speed on GPUs. Wang et al. [12] recently introduced a computationally expensive cost aggregation scheme in a dynamic-programming stereo framework, and obtained accurate disparity estimation results. But their real-time speed is only achieved on relatively low resolution stereo images with very limited disparity levels, while computational resources of both the CPU and the GPU are consumed.

"Algorithmic" prior art describes concepts like "Variable Window Size" and "Variable Window Shape" for best marrying the "edge preserving" and "uniform region" processing in stereo matching. These approaches exploit very complex schemes of multi-scale and bilateral filtering, which has the consequence that this leads to very GPU-unfriendly processing (e.g. dynamic programming that is so control-intensive that GPU's (or on any other "control-limited" architecture (or even ASIC)) fail to achieve good performance).

SUMMARY OF CERTAIN INVENTIVE ASPECTS

Certain inventive aspects relate to a cost-effective IBR system and method capable of yielding any desired view with competitive visual quality at interactive rates.

One inventive aspect relates to multimedia applications, based on stereo matching, which can be used in multi view multimedia applications.

Another inventive aspect relates to fast variable center-biased windowing for high-speed stereo on programmable graphics hardware.

Another inventive aspect relates to high-speed stream-centric dense stereo and view synthesis on graphics hardware.

Another inventive aspect relates to real-time stereo correspondence using a truncated separable Laplacian kernel approximation on graphics hardware.

Another inventive aspect relates to methods for providing an alternative method and apparatus for providing variable window size and shape with a combination of a plurality of (e.g. four) basic windows of the same shape, e.g. square, that partially overlap and cluster in different ways in the last stage (not the first stages, as is classically done) of the pipeline.

Another inventive aspect relates to a 2D filtering process to create the filtered data, which is further separated conveniently in separable 1D filters that can optimally be mapped onto a GPU architecture (or on any other "control-limited" architecture (or even ASIC)) without any overhead, and with good "data packing" capabilities (e.g. using 8-bit integer processing, and avoiding cumulative error accumulation of some iterative, floating-point operations).

Another inventive aspect relates to a method wherein all control (the variable shapes) is avoided over the full pipeline, except for a later or last stage that takes care of the "non-linear" combination of a plurality of (e.g. four) basic windows of similar shape, e.g. a square, as an alternative to control-intensive "Variable Window Shape" processing. Moving such "control" from the beginning of the GPU pipeline to a later stage or to the end stage has the advantage that the GPU data streaming is very fluent: since classically an image processing pipeline starts with a lot of data to process, and often gradually reduces that amount of data to process the more it reaches the end of the pipeline, one understands that the "last stage control" is more advantageous than a "first stage control".

One embodiment of the present invention may be described as follows:

A method for determining depth information for at least one pixel from a plurality of N (e.g. 2)-D images (e.g. of a scene obtained with different image capturing means having a different viewpoint on the scene), comprising applying N−1 (e.g. 1)-D filtering operations in a first dimension on the images; subsequently applying N−1 (e.g. 1)-D filtering operation in a second dimension (different from the first dimension) on the filtered images and selecting the depth information from the (double filtered) images.

The filters can be N−1D Laplacian kernels having a per pixel adaptable weighting parameter, expressing the geometric proximity to the pixel, the Laplacian kernels being derived from a N D separable N D Laplacian kernel (e.g. based on the so-called Manhattan distance metric).

Another inventive aspect relates to a method for filtering a part of an N (e.g. 2)-D images with a kernel, comprising performing a plurality of filtering operations with an approximated kernel, each of the filtering operations acting on a subpart of the part of the image, the subparts being partially overlapping, followed by a selection of the outcome of one of the filters.

The filtering is performed for at least one pixel, the subparts of the filtering at least share the pixel.

Another inventive aspect relates to an image-based method, executed on a computing platform, of generating at least one intermediate image of a scene from at least two input images captured from a different viewpoint on the scene, the method comprising: determining depth information for at least one pixel/on a pixel by pixel basis (i.e. dense stereo) by finding corresponding (e.g. stereo matching thereby finding depth information for corresponding pixels resulting in a disparity map) pixels (e.g. inverse warping) in the at least two images (e.g. local processing of the image followed by WTA, variable, center-based window, pixel-wise adaptive); and subsequent generating the intermediate image (i.e. view synthesis) from the depth information, the intermediate image generating processes being adapted for removing artifacts from the depth information due to incorrect correspondence determination and/or occlusions.

The process of generating the intermediate image preferably selects from a plurality of generating methods (e.g. adaptive interpolation scheme, forward warping method, . . . ) these methods being capable of generating a image within a predefined quality constraint and capable of being executed on the computing platform within a predefined speed (resulting in real-time/on-line/interactive behavior).

The processes are preferably adapted (e.g. they are stream-centric) for optimally exploiting the parallel processing and/or hardware accelerating primitives provided by the computing platform (e.g. use of built-in bilinear texture look-up capability and/or gather operation, parallel random access memory read operation for the inverse warping).

The adaptive interpolation scheme is preferably adaptively selecting one of the input images as the texture source further used for handling visual artifacts, based on a photometric outlier map.

The method may include: determining depth information for at least one pixel/on a pixel by, pixel basis (i.e. dense stereo) by finding corresponding pixels (inverse warping) in the at least two images (e.g. local image processing +WTA, variable, center-based window, pixel-wise adaptive) (e.g. stereo matching thereby finding depth information for corresponding pixels resulting in a disparity map) comprises:

1. Matching cost computation;
2. Cost aggregation (e.g. using truncated (threshold) absolute difference), based on a set of variable center-biased support windows wherein the most suitable support window is finally selected adaptively per pixel; a separable quadrant/slightly overlapping regions (each containing the center pixel) based cost aggregation, using a truncated separable approximation of a 2D Laplacian kernel plus appropriately deciding the strength of the grouping for each support pixel, the support weight determination being based solely on geometric proximity;
3. Adaptive selection of the support window; and
4. A local WTA optimization.

Another inventive aspect relates to a method for determining depth information [e.g. by inverse warping] for at least one pixel on a pixel by pixel basis (i.e. dense stereo) by finding corresponding pixels in the at least two images by:

(a) generating for a predefined (e.g. from a user selected view point) an interpolation of the at least two images for a plurality of distances/depths;

(b) generating for the pixel for a range of distances/depths a cost based on the interpolation;

(c) performing a filter operation/convolution on the costs; and (d) selecting for the pixel this distance with the minimum cost (WTA);

[e.g. local image processing] the filter being non-zero only in a region/window around the pixel;

[e.g. use of multiple windows, adaptive selection of suitable window] performing the filtering/convolution process for a partially plurality of overlapping regions/windows, each window comprising the pixel and applying (d) (above) on the cost of the region/window with itself the minimal cost, wherein determining the cost aggregation is performed by performing a convolution with a predefined filter. Determining the cost aggregation, requiring a convolution with a predefined 2-D filter is preferably performed by performing a first convolution with a predefined 1-D filter in a first dimension and subsequently by performing a second convolution with a predefined 1-D filter in a second dimension different (even perpendicular to) from the first dimension.

Determining the cost aggregation for a plurality of support windows is preferably performed by sharing at least part of the convolutions needed for performing the cost aggregation of each of the support windows.

Another inventive aspect relates to a method for matching pixels in two images, for use in a method of computing an optimal disparity value of a pixel, the method comprising:

inputting two input images;

computing from the input images a plurality (e.g. four) of first costs for the pixel, each cost being associated with a region of a first type, the regions of the first type (quadrants) being overlapping and including the pixel (center biased), the region (of an elementary set) being substantially equal in size and shape;

computing from the first costs, for the pixel, a plurality of second costs, each cost being associated with a region, the regions of the second type (e.g. called support windows) being overlapping and including the pixel (i.e. the regions are center biased), at least part of the regions of the second type having a substantially different size and/or shape (e.g. variable size/shape, three different categories);

selecting from the second costs the minimal cost and selecting the corresponding disparity value as the optimal disparity value (e.g. by a WTA approach).

The second costs are preferably normalized with the region size.

Optionally, a penalty can be added to the second cost to bias the method to regions with larger sizes.

The first cost can be a sum of absolute differences of pixel values from the input images, computed over the region of a first type.

The first cost can be computed on the input images after filtering with a center-biased 2D filter.

The filtering can be applied in two subsequent processes of applying 1D filters, each filter oriented in another direction.

Another inventive aspect relates to a method for image synthesis at the predetermined viewpoint from two input images, the method comprising:

creating the image by view-dependent linear interpolations;

determining ambiguous portions in the created image; and correcting the ambiguous portions in the created image by exploiting disparity information from nearby unambiguous portions in the created image.

Another inventive aspect relates to a fast and accurate possibility for determining depth information in a multi view multimedia application. For instance, the inventive aspect can be applicable to multimedia applications that are so tuned for enhancing execution of software reprints on GPU's or on any other "control-limited" architectures or even on ASICs. The multimedia applications can be run on computer-based multimedia systems.

Another inventive aspect relates to a method, a device, an image processing system and a computer program product for multimedia applications that are based on stereo matching. Particularly the use of the system and/or the method and/or the device in multi view multimedia applications such as in a movie is provided In one aspect the method comprises filtering in at least a first and a second dimension of the at least one pixel of at least two images, and detecting the depth information from the at least one pixel of the at least two images.

Another inventive aspect relates to a method which allows for a fast and accurate possibility for determining the depth information in a multi view multimedia application. In this manner the variable window size and the window shape are imitated with a combination of a plurality of basic square windows, such as four basic square windows, that partially overlap and cluster in different ways in the last stage of the pipeline. Hence, this aspect works in contrast to the prior art on the last stage and not on the first stages, as is classically done.

The device comprises a filtering unit for filtering in at least first in a second dimension of the at least one pixel of at least two images, and a detecting unit for determining the depth information from the at least one pixel of the at least two images.

The system comprises at least one device and performs the method mentioned.

Preferably the method of use for an image processing system and/or for a method and/or for a device for determining the depth information from at least one pixel in a movie, where at least two scenes are captured with at least one image capturing unit and with at least one viewpoint on the at least two scenes.

Finally, a computer program product is provided comprising code means adapted to perform the method when run on a computer device.

According to a preferred embodiment of the invention, process a) is performed (filtering process) with Laplacian kernels comprising a per pixel adaptable weighting parameter. This allows for an easy implementation of the filtering process.

According to another preferred embodiment of the invention the Laplacian kernels are derived from multi dimensional separable Laplacian kernels based on the Manhattan distance metric and the per pixel adaptable weighting parameter comprises the diametric proximity to the at least one pixel. This allows for an easy, fast and reliable approach to detect the depth information in a multi view multimedia application.

According to another preferred embodiment of the invention the methods further comprises filtering parts of the at least two images with an approximate kernel, wherein the parts of the at least two images are at least partially overlapping. In this way an accurate solution for determining the depth information is obtained.

According to yet another preferred embodiment of the invention the parts of the at least two images comprise at least one combined pixel and the filtering is performed for the at least one combined pixel. This supports the fastness of the method and is easy to implement.

The advantages of the features of the device are similar to the advantages of the features of the method. The image processing system further comprises at least one image capturing unit to capture at least an image in a multimedia application.

Another inventive aspect relates to filtered data that can optimally be mapped onto a GPU architecture, on any other "control-limited" architectures or even on an ASIC without any overhead and with good "data packing" capabilities. This can be done by using eight-bit integer processing, and avoiding accumulative error accumulation of some iterative, floating-point operations.

In certain applications, "Last stage control" may be more advantageous than a "first stage control" since in the classical way an image processing pipeline starts with a big amount of data which has to be processed and often gradually reduces that amount of data to process the more it reaches the end of the pipeline. Hence, in this manner a real-time or on-line performance can be obtained.

In another aspect, a device for computing a disparity value of a pixel is disclosed. The device comprises a receiving unit configured to receive two input images. The device further comprises a first computing unit configured to compute from the input images a plurality of first costs for the pixel, each cost being associated with a region of a first type selected from a plurality of regions of the first type, the regions of the first type being overlapping with and including the pixel, the regions being substantially equal in size and shape. The device further comprises a second computing unit configured to compute from the first costs for the pixel a plurality of second costs, each cost being associated with a region of a second type of a plurality of regions of the second type, the regions of the second type being overlapping with and including the pixel, at least some of the regions of the second type having a substantially different size and/or shape. The device further comprises a first selecting unit configured to select from the second costs the minimal cost and a second selecting unit configured to select the corresponding disparity value as the disparity value.

In another aspect, an image-based rendering IBR system is disclosed. The system is capable of performing online stereo matching and view synthesis at high speed, completely running on the graphics processing unit (GPU). Given two rectified stereo images, the system first extracts the disparity map with a novel stream-centric dense stereo correspondence algorithm. For visually plausible image synthesis, an adaptive view interpolation scheme is then used to effectively handle occlusions and incorrectly matched pixels, assisted by a photometric outlier map. To allow even faster intermediate view generation, an alternative forward warping method is seamlessly integrated, enabling a coarse-grained quality-complexity scalability. Besides yielding artifact-free intermediate views, the system is also specifically designed to leverage the GPU streaming architecture for high execution speed The invention will now be described with reference to the following drawings.

DETAILED DESCRIPTION OF CERTAIN ILLUSTRATIVE EMBODIMENTS

Figure 1:
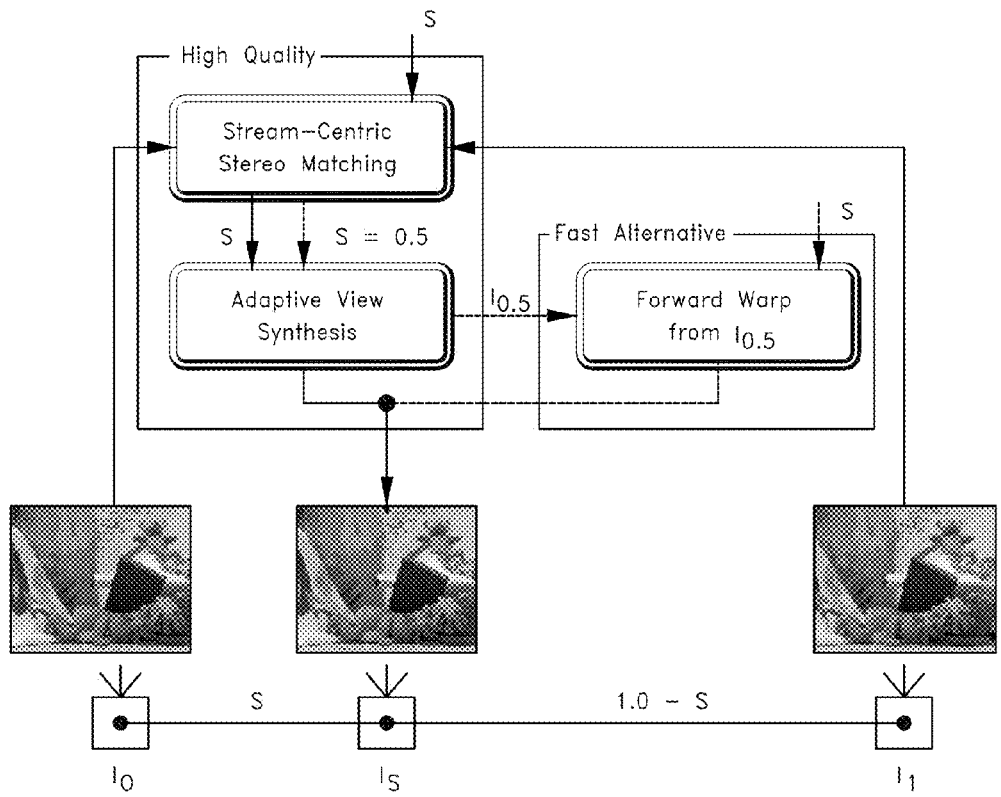
FIG. 1 shows a high-level decomposition of the proposed IBR system on a GPU in accordance with embodiments of the present invention. The data paths for two optional view synthesis modes each of which is an embodiment of the invention, i.e., the quality mode and the speed mode, are marked in solid line and dashed line, respectively.

Certain embodiments relate to an IBR system and method for extracting sufficiently accurate disparity information from stereo images in real-time. In addition view synthesis methods and apparatus are provided using estimated disparities as the scene geometry interpretation. A local stereo matching algorithm is provided that is specially designed to achieve both competitive disparity quality and high-speed execution on GPUs. An aspect of the present invention relates to the provision of an efficient variable center-biased windowing approach, enabling a pixel-wise adaptive decision of the most suitable support patterns for different regions.

In one embodiment, the stereo matching method and apparatus provides a front-end of a complete IBR system that provides high-quality image rendering, rather than geometrically correct disparity estimates. Disparity errors have an unequal impact on the synthesized image quality [13]. For real-time photorealistic (i.e., artifact-free) view generation, provides other constituent IBR parts, such as view synthesis, occlusion and hole handling. All the IBR modules can be jointly optimized to achieve a mutual synergy. One embodiment provides a good trade-off between the image quality and processing complexity. The trade-off is between computationally intensity for real-time rendering and visible synthesis errors.

One embodiment relates to methods and apparatus comprising a stream-centric stereo matching apparatus or method and an adaptive view synthesis technique or apparatus, which embodies a set of cost-effective postprocessing schemes. The adaptive view synthesis technique and apparatus is based on an automatically generated photometric outlier map, and tackles visual artifacts, by adaptively selecting one single image from the input stereo pair as the source texture. To generate multiple intermediate views at even higher speed, an alternative forward warping method can also be seamlessly integrated into the IBR system, enabling a coarse-grained quality-complexity scalability.

One embodiment differs from IBR design paradigm based on the CPU sequential programming model as it is optimized for GPUs, i.e. massively parallel high-performance processors; The methods according to one embodiment can be abstracted as various forms of the data-parallel streaming model [16]. This stream processing model emphasizes coherent access to memory and memory locality, and efficiency of data parallelism. To lead to great performance on the GPU, one embodiment provides design application-specific stream kernels, which are applied to process the input data in parallel, generating one or more output arrays. For more details of the GPU stream processing model, and the rendering pipeline, as well as a review of GPGPU (General-Purpose computation on GPUs) research activities, readers are referred to [17].

Certain aspects are listed as follows:

1. A fast variable center-biased windowing method for reliable stereo matching is proposed, and its stream-centric nature is well-suited to the GPU streaming architecture, as well as other parallel platforms;

2. Based on a photometric outlier map, a cost-effective adaptive view synthesis technique is proposed, yielding plausible novel views at low complexity on GPUs;

3. A fast forward warping based view synthesis method is integrated, as a speed-optimized alternative to the adaptive view interpolation scheme, while largely sharing a common part of the processing pipeline;

4. A number of critical optimizations have been applied to the entire IBR system implementation, intelligently exploiting various computational resources inherent in modern graphics hardware;

5. An end-to-end optimized IBR system and method is provided, completely running in real-time on a GPU, that is capable of estimating competitive disparity maps and synthesizing plausible intermediate views at a state-of-the-art speed.

Overview of an IBR System

High-Level System Decomposition

As shown in FIG. 1, an IBR system according to an embodiment of the present invention comprises three connected components: 1) a stream-centric dense stereo matching method or apparatus, 2) an adaptive view synthesis scheme or apparatus based on a photometric outlier map, and 3) a fast forward warping method or apparatus favoring rapid intermediate view generation, as an alternative to 2).

Given two rectified stereo images $I_0$ (left view) and $I_1$ (right view), an IBR system in accordance with an embodiment of the present invention supports two operating modes for synthesizing any desired intermediate view $I_s$, where $s \in [0,1]$ is the normalized viewing distance from $I_0$. The quality mode generates highly plausible intermediate views at relatively more computational cost, while the speed mode significantly speeds up view synthesis at reasonable quality degradation, each being an embodiment of the present invention. Their data paths are marked in solid line and dashed line in FIG. 1, respectively.

View Synthesis Oriented Stereo Reconstruction

Disparity estimation (or stereo matching) need not be computed with respect to one of the input views, but rather is performed preferably at a specific intermediate viewpoint see [22, 23], and plane sweep algorithms [4, 15].

Figure 2:
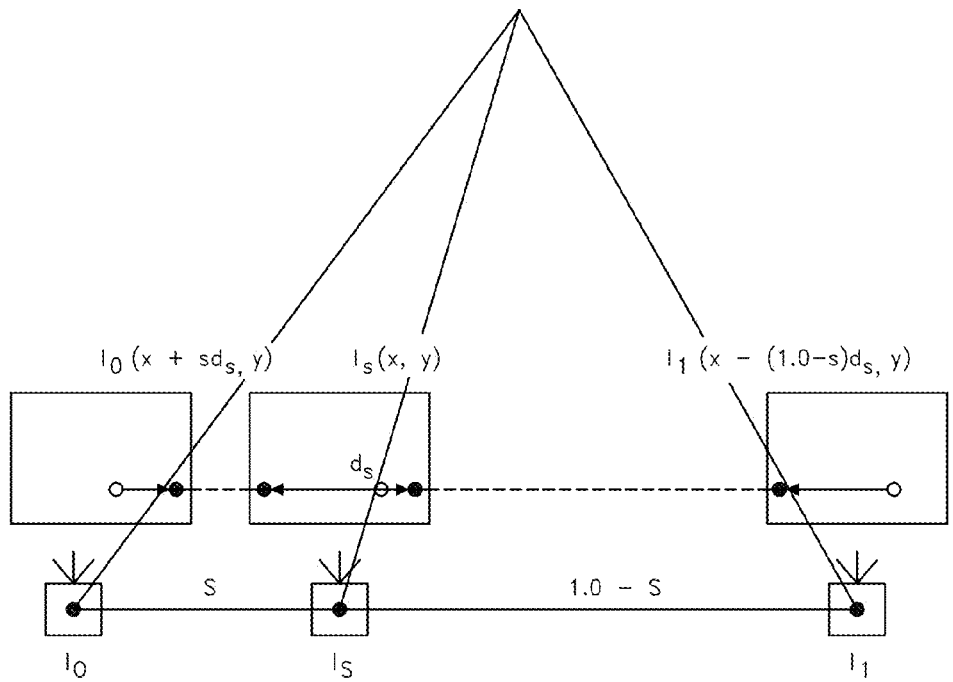
FIG. 2 shows a view synthesis oriented stereo matching based on the inverse warping method that can be used with certain embodiments. A dense disparity map $D_S$ is computed for the desired viewpoint s in accordance with embodiments of the present invention.

More specifically, stereo matching estimates a dense disparity map $D_s=\{d_s(x,y)\}$ for the user-requested intermediate viewpoint s, where (x,y) is a pixel on the image lattice of the requested view $I_s$. This approach is in contrast to conventional stereo methods [5] that yield a "fixed" disparity map only for the one, e.g. left viewpoint (s=0). In line with this new method, if the pixel (x, y) is visible in both input views, its associated disparity $d_s(x,y)$ establishes a correspondence match between $I_0(x+sd_s,y)$ and $I_1(x-(1-s)d_s,y)$ as shown in FIG. 2. Essentially speaking, this is the inverse warping approach [5], which usually improves the synthesized image quality by enabling the uniform intensity interpolation in the input images. Moreover, modern GPUs power this processing with the built-in bilinear texture lookup capability, and the efficient gather operation (i.e., a parallel random access memory read operation) [16, 17].

Stream-Centric Dense Stereo Matching

An IBR system according to embodiments of the present invention uses dense stereo (i.e., per-pixel depth) based view synthesis, and estimation of a dense disparity map of. To this end, one embodiment provides a stream-centric local stereo matching algorithm, which yields disparity quality for both homogeneous regions and depth discontinuities. The proposed method leads to considerably high disparity estimation throughput on the GPU, because of its regular and stream-centric processing property.

Figure 3:
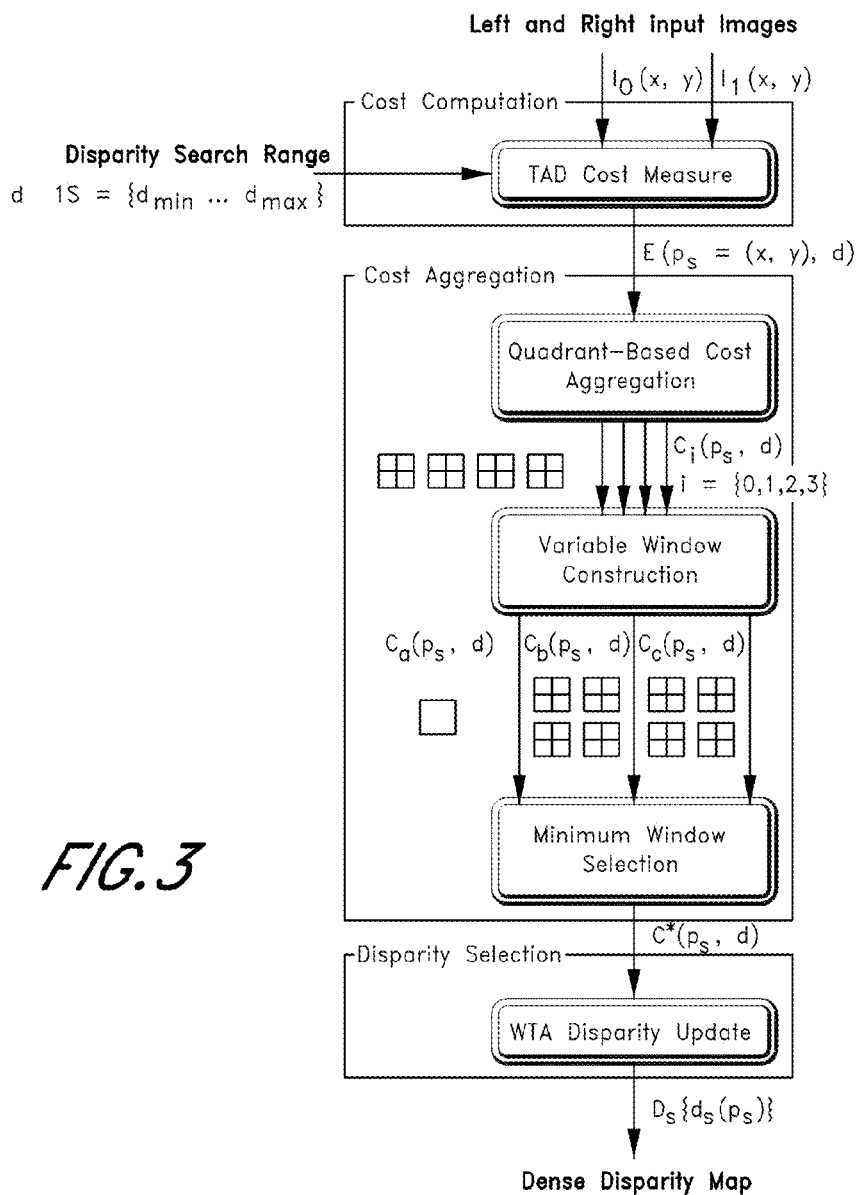
FIG. 3 shows a framework of a proposed stereo matching algorithm in accordance with an embodiment of the present invention.

An embodiment of the local stereo method according to an embodiment of the present invention contains three major processes: matching cost computation, cost aggregation, and finally disparity selection. In the first process, a matching cost for every possible disparity value of each pixel is computed. To suppress the influence of mismatches during the subsequent cost aggregation process, a truncated absolute difference (TAD) schema can be adopted as the matching cost measure. The cost aggregation process preferably reduces the ambiguity in matching. In the last disparity selection process, a local WTA (Winner Takes All) optimization is performed at each pixel, e.g. by simply choosing the disparity associated with the minimum cost value. The entire framework of a stereo algorithm in accordance with an embodiment of the present invention is illustrated schematically in FIG. 3.

In accordance with the cost aggregation process a set of variable center-biased support windows are used, and the most suitable support pattern is then adaptively decided for each pixel. The advantages of this stereo method are two-fold. First, because of the versatile set of support windows and the pixel-wise optimal pattern selection, cost aggregation is adequately performed in an adaptive manner for different pixel locations. Therefore, the proposed stereo method tackles both homogeneous image regions and depth discontinuities appropriately, adapting to the spatially varying image structures. Second, unlike the image-gradient-guided correlation method [11], the construction of the support windows invokes only regular convolutions with coherent access to the data, plus a few simple additions locally for each pixel. Since the adaptive support pattern selection only takes place in the last stage with a marginal complexity, the proposed stereo method is predominantly a branch-free stream processing kernel, leading to high performance on the GPU. Specifically, the proposed cost aggregation process is composed of two parts: 1) efficient separable window-based (using a plurality of windows having the same size and shape, e.g. quadrant-based) cost aggregation, and 2) adaptive selection of variable support patterns. This may be formalized as: a computer based method for computing a disparity value of a pixel, the method comprising:

inputting two input images;

computing from the input images a plurality of first costs for the pixel, each cost being associated with a region of a first type selected from a plurality of regions of the first type, the regions of the first type being overlapping and including the pixel, the regions being substantially equal in size and shape (i.e. windows such as quadrants);

computing from the first costs, for the pixel, a plurality of second costs, each cost being associated with a region of a second type of a plurality of regions of the second type, the regions of the second type being overlapping and including the pixel, at least some of the regions of the second type having a substantially different size and/or shape (i.e. selecting variable window patterns);

selecting from the second costs the minimal cost, and selecting the corresponding disparity value as the disparity value.

Efficient Separable Quadrant-Based Cost Aggregation

The goal of this stage is to compute an elementary set of window costs, so that a useful range of variable center-biased support patterns can be easily built upon this basic set later. Instead of using box-filters commonly adopted for the window cost aggregation [6], one embodiment makes use of a truncated separable approximation to an isotropic 2D Laplacian kernel for this task. The latter proves its effectiveness in a state-of-the-art local stereo method [8] by appropriately deciding the strength of grouping for each support pixel. To achieve a good trade-off between the quality and the speed, only computing the adaptive support-weight for each pixel based on the geometric proximity [8] is attempted, while using the variable center-biased windows to ensure competitive quality results in both homogeneous regions and depth discontinuities.

Figure 4A:
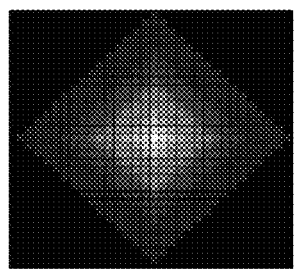
FIG. 4 shows efficient separable quadrant-based aggregation kernels in accordance with an embodiment of the present invention. (a) The 2D support-weight map of the proposed SA-LAP kernel F. (b) Edge-preserving elementary support windows $W_i$ (i=0, 1, 2, 3), defined over the i-th active quadrant. (c) A sample support-weight map $F_0$ defined over the window $W_0$.

Strictly speaking, the classical Laplacian kernel is non-separable because of its isotropic Euclidean distance term. This renders its exact implementation costly. To ease the computational cost, one embodiment makes use of a separable approximated variant to the 2D isotropic Laplacian kernel (see FIG. 4(a)) which allows independent filtering in two directions, $$f_p(\Delta \tilde{g}_{pq}) = \exp\left(-\frac{(\Delta \tilde{g}_{pq})}{\gamma}\right) \qquad (1)$$
$$= \exp\left(-\frac{(|\Delta x_{pq}| + |\Delta y_{pq}|)}{\gamma}\right)$$
$$= \exp\left(-\frac{|\Delta x_{pq}|}{\gamma}\right) \cdot \exp\left(-\frac{|\Delta y_{pq}|}{\gamma}\right),$$

where $\Delta g_{pq}$ is an approximated Euclidean distance between p and q in the 2D image domain. $\Delta x_{pq}$ and $\Delta y_{pq}$ denote the horizontal and vertical distance between p and q, respectively. $\gamma$ determines the fall-off rate of the kernel. This separable approximation to the 2D Laplacian kernel (SA-LAP) can be very efficiently implemented by two cascaded 1D filter processes along the x and y axes. It reduces the computational load significantly from O(m×n) to O(m+n), for an m×n kernel.

Figure 4B:
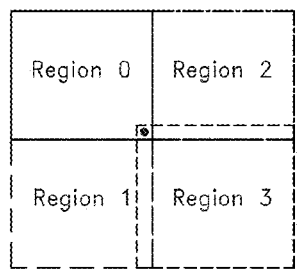

To tackle the "foreground-fattening" problem [24] near depth discontinuities, a large centralized support window is partitioned into a number, e.g. four slightly overlapping regions (or quadrants), each containing the center pixel as shown in FIG. 4(b). More rigorously, a full square support window is represented by an n-by-n matrix of ones, W, where every element is equal to 1. Then, as the result of the full window partition, an elementary window $W_i$ with directional partial supports is defined over the i-th active quadrant, while the elements in the rest part of the full window are masked off accordingly. For instance, the elementary support window defined over the top-left quadrant, $W_0$, can be specifically written as:

$$W_0 = \begin{bmatrix} 1_{w \times w} & 0_{w \times (n-w)} \\ 0_{(n-w) \times w} & 0_{(n-w) \times (n-w)} \end{bmatrix}, \qquad (2)$$

where 1 and 0 represent a matrix of ones and a zero matrix, respectively. w=(n+1)/2 is the width of quadrants. According to FIG. 4, the other quadrant-based supporting matrices $W_1$, $W_2$, and $W_3$ can be defined in a similar manner.

Figure 4C:
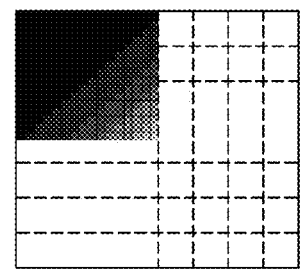

Let F be an n-by-n centralized weighting matrix given by the SA-LAP kernel in (1). We can construct four directionally truncated SA-LAP kernels $F_i$ from the elementary support window configurations $W_i$. That is $F_i = F \bullet W_i$, i=0, 1, 2, 3. The operator • denotes the Hadamard product for two matrices of the same dimensions, also known as the entrywise product. As an example, the support-weight map of $F_0$ is shown in FIG. 4(c) having a plurality of regions having the same size and shape, e.g. quadrants. With these four directional SA-LAP kernels $F_i$, a set of matching costs for the plurality of regions having the same size and shape, e.g. quadrant-based matching costs $C_i(p_S,d)$ can be computed for every pixel $p_S$ to avoid filtering across strong edges. Here $p_S=(x,y)$ is a pixel on the image lattice of the requested view $I_S$, and d is the disparity hypothesis.

Before performing the quadrant-based cost aggregation, a computation is made of the pixel-wise raw matching cost $E(p_S,d)$ using all color channels {R,G,B}, $$E(p_s, d) = \min\left(\sum_{c \in \{R,G,B\}} |I_0^c(x+sd, y) - I_1^c(x-(1-s)d, y)|, \tau\right), \qquad (3)$$

where $\tau$ is the threshold used for the truncated absolute difference measure. When s=0, (3) degenerates to the conventional disparity estimation for the left viewpoint.

By convolving $E(p_S,d)$ with every truncated SA-LAP kernel $F_i$, a normalized matching cost $C_i(p_S,d)$ is generated correspondingly for i=0, 1, 2, 3, as follows, $$C_i(p_s, d) = \frac{F_i * E(p_s, d)}{F_i * W} = \frac{(F \cdot W_i) * E(p_s, d)}{\mu}, \qquad (4)$$

where * denotes the image convolution centered on the point $p_S$. The constant $\mu = F_i * W$ (i=0, 1, 2, 3) is to normalize the aggregated window cost, since windows of different sizes will be compared. This normalization factor also helps to scale up the data precision range when implemented on GPUs.

Adaptive Selection of Variable Support Patterns

Once the elementary set of costs for the plurality of regions having the same size and shape, e.g. the quadrant-based costs $\{C_i(p_S,d)\}$ are computed with equation (4), a useful range of center-biased support windows with variable sizes and shapes can readily be constructed, unlike the fixed-sized multiple windows [6] and shiftable windows [5]. In addition to the four elementary corner patterns (FIG. 5(f-i)) [18], two more categories are devised to approximate the ideal support configuration for depth edges (FIG. 5(b-e)), and homogeneous areas (FIG. 5(a)), respectively. In consequence, appropriate local support can be adaptively chosen from this versatile set of a plurality of variable support patterns. This essentially enables the stereo method to perform a reliable cost aggregation for different image regions, addressing the typical dilemma of picking a constant window size for both homogeneous regions and depth discontinuities. Another important advantage is that computing matching costs over these variable windows invokes little computational load increase, as a few more pixel-wise additions actually suffice.

Taking $W_{0,1}$ (FIG. 5(b)) as an example, the support windows for depth edges are easily built by adding up two contiguous elementary windows $W_i$, $$W_{0,1} = W_0 + W_1. \qquad (5)$$

Similarly, $W_{1,3}$, $W_{0,2}$, and $W_{2,3}$ can be defined.

Based on (4) and (5), the normalized matching cost $C_{0,1}(p_S,d)$, aggregated over the support window $W_{0,1}$, is easily derived as follows, $$C_{0,1}(p_s, d) = \frac{F_{0,1} * E(p_s, d)}{F_{0,1} * W} \quad (6)$$

$$= \frac{(F \cdot W_{0,1}) * E(p_s, d)}{(F \cdot W_{0,1}) * W}$$

$$= \frac{(F_0 + F_1) * E(p_s, d)}{(F_0 + F_1) * W}$$

$$= \frac{\mu C_0(p_s, d) + \mu C_1(p_s, d)}{2\mu}$$

$$= 1/2(C_0(p_s, d) + C_1(p_s, d)).$$

With only one addition, other matching costs $C_{1,3}(p_S,d)$, $C_{0,2}(p_S,d)$, and $C_{2,3}(p_S,d)$ are similarly derived as (6).

For homogeneous image areas, the largest possible support window $W_a$ is constructed using four elementary windows, $$W_a = \sum_{i=0}^{3} W_i. \quad (7)$$

Its normalized matching cost $C_a(p_S,d)$ is given as follows, $$C_a(p_s, d) = \frac{F_a * E(p_s, d)}{F_a * W} \quad (8)$$

$$= \frac{(F \cdot W_a) * E(p_s, d)}{(F \cdot W_a) * W}$$

$$= 1/4 \sum_{i=0}^{3} C_i(p_s, d).$$

After computing the normalized matching costs for this predefined set of center-biased support windows, the best patterns of minimum cost values are selected from each configuration category (labeled in FIG. 4 by a, b, c). Their respective size-penalized matching costs (i.e., $C_a$, $C_b$, and $C_c$) are defined in (9). For conciseness, the variables $(p_S,d)$ have been omitted from notations whenever appropriate.

$$\begin{cases} C_a(p_s, d) = 1/4(C_0 + C_1 + C_2 + C_3) \\ C_b(p_s, d) = \min(C_{0,1}, C_{0,2}, C_{2,3}, C_{1,3}) + \alpha \\ C_c(p_s, d) = \min(C_0, C_1, C_2, C_3) + \beta \end{cases} \quad (9)$$

In eq. (9), an additive penalty term $\alpha$ is added for $C_b$, and $\beta$ for $C_c$, where $0<\alpha<\beta$. The purpose is to explicitly implement bias to larger windows. As discussed in the variable window approach [7], this term is important in untextured regions, where the normalized window costs are approximately equal for variable support patterns. Larger windows should be preferred in this case for a reliable performance. The empirical penalty parameters $\alpha$ and $\beta$ are set constant for all our experiments.

Provided with a number, e.g. three best representative patterns decided from equation (9), the minimum value of them is chosen as the cost for the center pixel $p_S$, i.e., $C^*(p_S,d)$ in (10). This process enables the adaptive selection of the most suitable support pattern for the pixel $p_S$, given the current disparity hypothesis d.

$$C^*(p_s,d) = \min(C_a, C_b, C_c). \quad (10)$$

Finally, after the matching cost aggregation process, the disparity of each pixel is simply selected by the local WTA (Winner-Takes-All) method without any global reasoning as $$d_s(p_s) = \arg\min_{d \in S} C^*(p_s,d), \quad (11)$$

where is the set of all possible disparities. This WTA decision eventually results in a dense disparity map $D_S = \{d_S(p_S)\}$ for the requested viewpoint s.

Accelerating Cost Aggregation by 1D Filtered Data Reuse

Figure 5:
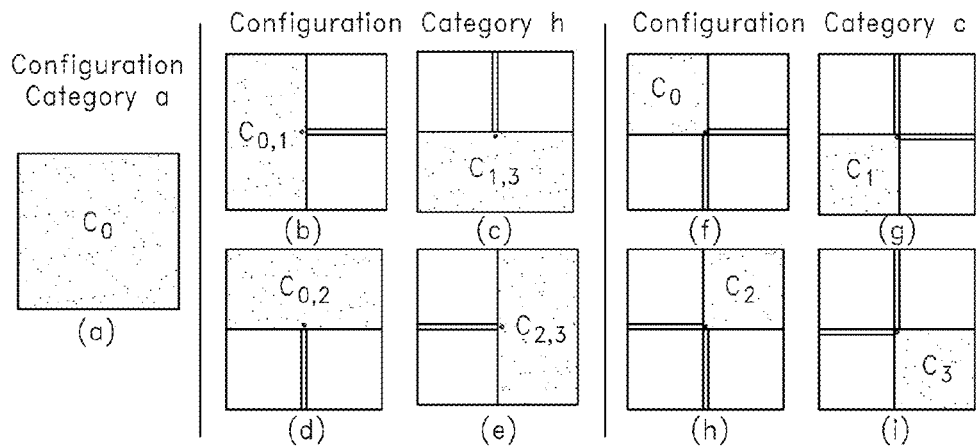
FIG. 5 shows three configuration categories of support patterns to approximate the local scene geometry of (a) homogeneous areas, (b-e) depth edges, and (f-i) depth corners in accordance with an embodiment of the present invention.

As the fundamental construct of the stereo algorithm the truncated SA-LAP is very fast to compute. The reason is that $F_i$ in (4) is not only separable, i.e., $F_i(x,y) = f_i(x)f_i(y)$, but also $F_0$ and $F_1$ share exactly the same 1D convolution kernel in the x-direction, i.e., $f_0(x) = f_1(x)$. Instead of executing four convolutions to derive $C_0(x,y)$ and $C_1(x,y)$, (for clarity, the depth hypothesis d is not included in the notations here) one can reuse in the computer based method the identical horizontal-filtered intermediate results $C_L(x,y)$ to remove computation redundancy as follows, $$\begin{cases} C_0(x, y) = \frac{E(x, y) * F_0(x, y)}{\mu} = \frac{E(x, y) * f_0(x) * f_0(y)}{\mu_x \cdot \mu_y} \\ C_1(x, y) = \frac{E(x, y) * F_1(x, y)}{\mu} = \frac{E(x, y) * f_1(x) * f_1(y)}{\mu_x \cdot \mu_y} \end{cases} \quad (12)$$

$$\Rightarrow \begin{cases} C_L(x, y) = E(x, y) * f_L(x)/\mu_x \\ C_0(x, y) = C_L(x, y) * f_0(y)/\mu_y \\ C_1(x, y) = C_L(x, y) * f_1(y)/\mu_y \end{cases}$$

where $f_L(x) = f_0(x) = f_1(x)$, and $\mu_x = \mu_y = \mu^{1/2}$. As a result, only three 1D convolutions are needed to obtain $C_0(x,y)$ and $C_1(x,y)$. As shown in FIG. 5, the same is valid for $C_2(x,y)$ and $C_3(x,y)$. Hence, the major complexity of our stereo method only consists of 6-times 1D image convolution, and this regular filtering operation can be greatly accelerated by the massively parallel processors in GPUs [16].

Cost-Effective Intermediate View Synthesis

In accordance with embodiments of the present invention the IBR system features a flexible choice between two proposed view synthesis modes, which fit different computational processing power of underlying GPUs. In accordance with an embodiment of the present invention the adaptive view synthesis method can be used in the quality mode. One embodiment also includes the fast view synthesis method in the speed mode.

Adaptive View Synthesis for Photometric Outlier Handling

Given an estimated dense disparity map $D_s = \{d_s(x,y)\}$ for the viewpoint s, the desired intermediate view image $I_S$ can readily be generated with view-dependent linear interpolation [23], as follows:

$$I_s(x,y) = (1-s) \cdot I_0(x+sd_s,y) + s \cdot I_1(x-(1-s)d_s,y). \quad (13)$$

Despite the fact that this linear interpolation method works generally well, annoying image artifacts still arise from geometrical occlusions, violations of the constant brightness assumption (due to specular reflections or the mixed pixel problem [2]), as well as imprecise disparity estimates. For instance, a majority of interpolation errors occur near depth discontinuities and border regions in the synthesized image.

In accordance with an embodiment of the present invention for high-quality view generation, an adaptive synthesis approach is provided to explicitly tackle these visual artifacts. In general, these synthesis artifacts are exposed as "ghosted" regions [5], and they typically result from the direct blending of two hypothetical correspondences of large photometric deviations. Therefore, the adaptive view synthesis method aims at detecting these problematic pixels, and filling plausible colors for them in the synthesized image $I_S$.

Driven by the goal of plausible view synthesis, the reliability of the estimated correspondence matches is evaluated photometrically. This evaluation results in a photometric outlier map $O_s = \{o_s(x,y)\}$, which identifies the synthesis errors to be tackled. When $o_s(x,y)=1$, it indicates that the current pair of correspondences have a large photometric difference, signaling that adaptive view synthesis should be applied to the pixel $(x,y)$; while $o_s(x,y)=0$ denotes the correspondences are matched of good confidence photometrically, so the linear interpolation in eq. (13) suffices.

To derive such a photometric outlier map $O_S$ that supervises the adaptive view synthesis process, a cost-effective photo-consistency checking is performed based on the Lambertian scene assumption. First, the absolute color difference between any two estimated corresponding pixels from $I_0$ and $I_1$ is computed, and then the pixels exceeding a preset difference tolerance $\lambda$ for Lambertian surfaces are labeled as outliers. Specifically, given the disparity estimate $d_s(x,y)\}$, the binary variable $o_s(x,y)$ is decided for the pixel $(x,y)$ as follows, $$o_s(x, y) = 1 - \prod_{c \in \{R,G,B\}} \delta(|I_0^c(x + sd_s, y) - I_1^c(x - (1-s)d_s, y)|, \lambda), \quad (14)$$

where $\delta(t,\lambda)$ is an indicator function that returns 1 when $t<\lambda$, otherwise 0. The result is a computed photometric outlier map for the stereo image.

As opposed to some stereo matching methods with explicit occlusion reasoning or modeling [3, 25, 26], the photometric outlier map here is not desired to be geometrically close to the ground-truth occlusion map, but instead the aim is to synthesize visually plausible images. This means that for effective IBR, there is no need to detect and label precisely any occlusions with e.g., time-consuming iterative energy minimization [26] or estimating two separate disparity maps for cross-checking [25], as long as the derived photometric outlier map can capture the interpolation errors, and the synthesized images appear physically plausible and artifact-free. In view of this requirement, half-occlusions (pixels only visible in one view) are just one cause among all aforementioned factors that lead to visual artifacts, when two problematic pixels are blended with eq. (13). Moreover, even occlusion detection works well, it remains important to fill half-occlusions with plausible colors.

Based on the photometric outlier map $O_S$ decided for the viewpoint s, the essential part of the adaptive view synthesis algorithm is to appropriately handle the detected sparse set of pixels, where improperly matched correspondences are blended. This set of pixels are concisely termed holes here, i.e., $(x_o,y_o)|o_s(x_o,y_o)=1$. Because GPUs are designed for parallel processing, iterative algorithms will severely reduce efficiency. Hence a non-iterative adaptive hole handling scheme is provided, as a cost-effective paradigm for GPU-based view synthesis and as an embodiment of the present invention. The proposed method is essentially a combined hypothesis testing: dependent on the depth discontinuity gap test result, either background disparity propagation or color uniformity testing is applied to fill in the holes with plausible color values. The processing flow can be more clearly unfolded as the following processes.

Figure 6:
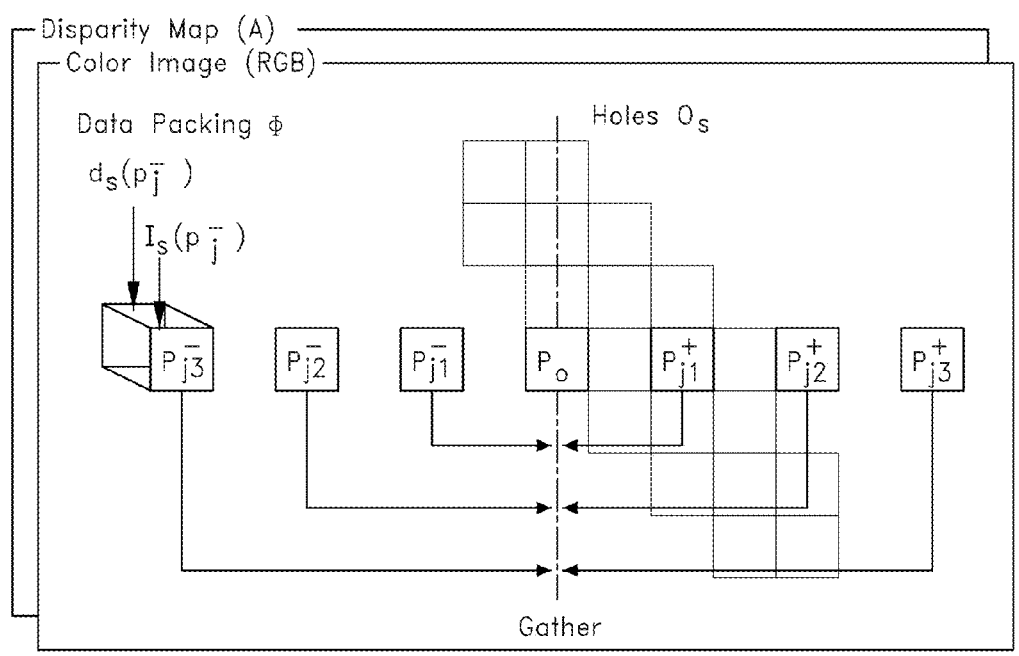
FIG. 6 shows neighborhood sampling for the identified hole $p_o$ in accordance with an embodiment of the present invention. Three neighboring pixels with position offsets are symmetrically sampled to both sides of $p_o$, powered by the parallel gather operation. Then, color values and initially estimated disparity for each sampled pixel are packed into a RGBA format for efficient vector processing on GPUs.

Process 1) For an identified hole $P_0 = (x_o, y_o)$, the method first samples at a set of neighboring pixel positions, $\{p_j^- = (x_o - j, y_o)\}$ and $\{p_j^+ = (x_o + j, y_o)\}$ ($j \in J = \{j_1, j_2, j_3\}$), symmetrically from both sides of the center pixel $p_o$. The sampling offset parameters $j_1, j_2,$ and $j_3$ are set empirically. As shown in FIG. 6, this local pixel sampling is a gather operation that is well supported by the GPU's pixel processors. To exploit the powerful RGBA-packed vector processing on the GPU, the method simultaneously loads three color channels of a sampled pixel and its associated disparity value into four RGBA channels, i.e., $\Phi(p_j^-) = [I_s(p_j^-), d_s(p_j^-)]$, and $\Phi(p_j^+) = [I_s(p_j^+), d_s(p_j^+)]$.

Process 2) This process is to compute the color and disparity hypotheses for the hole $p_o$, by inferring from reliable pixels (i.e., $p_j^\pm = (x_o \pm j, y_o)$ where $o_s(x_o \pm j, y_o) = 0$, $j \in J$) sampled on both left and right sides. Here the method reuses the center-biased weighting scheme developed in above, but adjacent holes are discarded from the aggregation to avoid contaminating the weighted sum. Thanks to the standard vector processing on the GPU, the color and disparity hypotheses $\hat{F}^-(p_o) = [\hat{I}^-(p_o), \hat{d}^-(p_o)]$ can be computed simultaneously from the left-sided neighboring pixels:

$$\hat{\Phi}^-(p_o) = \frac{\sum_{j \in J} v_j (1 - o_s(p_j^-)) \Phi(p_j^-) + \epsilon 1_{1 \times 4}}{\sum_{j \in J} v_j (1 - o_s(p_j^-)) + \epsilon}, \quad (15)$$

where $\{v_j = \exp(j/\gamma)\}$ are constant weighting factors with the same Laplacian fall-off rate $\gamma$ in (1). $1_{1,4} = [1, 1, 1, 1]$. The tiny constant $\epsilon$ is included to enforce the inferred disparity value $\tilde{d}(p_o)$ to 1 (i.e. the maximum normalized disparity value), if $\forall j \in J, o_s(\tilde{p}_j) = 1$. This enables the proper disparity propagation from the background side, as will be shown later. Replacing $\tilde{p}_j$ with $p_j^+$ in (15), $$\hat{\Phi}^+(po) = \left[\hat{I}^+(po), \hat{d}^+(po)\right]$$

is symmetrically compute for the right side.

Figure 7B:
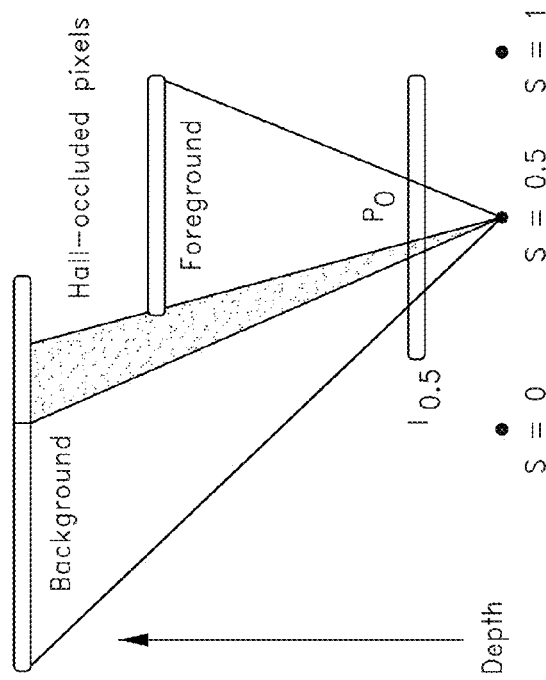
FIG. 7 shows a geometric illustration of half-occlusion.
Figure 7A:
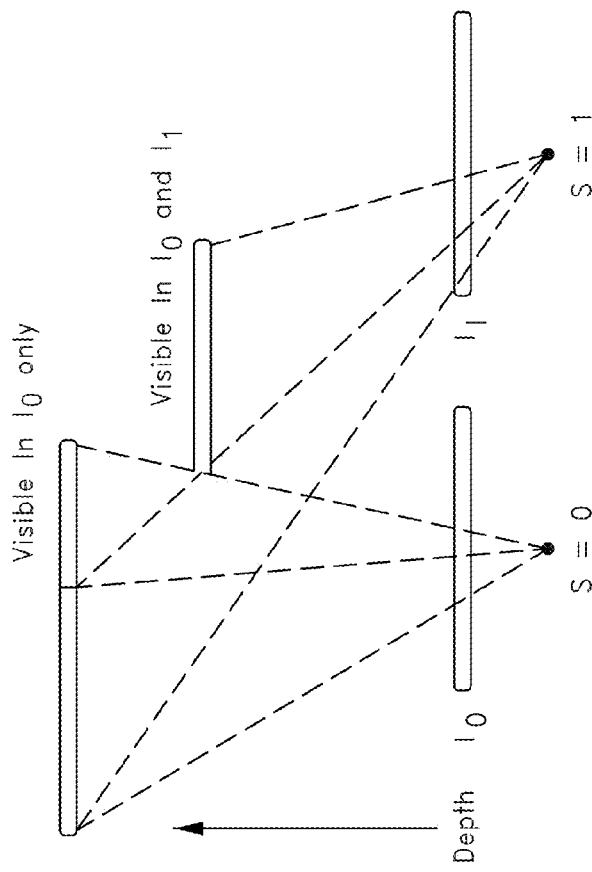

Process 3) The adaptive hole handling is a hybrid hypothesis testing approach. Because holes are caused by different reasons, they should be distinguished first, and then processed in adequate ways accordingly. Apparently, geometric occlusion is a major source leading to holes. FIG. 7 illustrates that half-occluded pixels are located near depth discontinuities, and they belong to the background part of the scene. Therefore, the holes due to occlusions can be detected by measuring the depth discontinuity gap. If the minimum depth discontinuity gap requirement is satisfied, i.e., $|\tilde{d}(p_o)\hat{d}^+(p_o)| > \delta$, then the current hole $p_o$ is regarded as a true half-occluded pixel, so continue with Process 4a and Process 5. Otherwise, the hole cannot attribute to the occlusion, then continue with Process 4b and Process 5. In practice, the method sets $\delta=2$, consistent with the definition of disparity discontinuities for stereo accuracy evaluation [5].

Process 4a) To appropriately handle the holes owing to half-occlusions, it is reasonable to propagate the inferred disparity information—from the background side of the occlusion—to the current position $p_o$ [25], as shown in FIG. 7. Choosing the side farther to the desired camera view s, the method adaptively fills the occluded pixels according to equation (16), using either the left image or the right image as the single source. The position variable $p_o$ is ignored in equation (16) for conciseness.

$$I_s(p_o) = \begin{cases} I_0(\tilde{p}_0) = I_0(x_o + s \cdot \hat{d}^-, y_o), & \text{if } \hat{d}^- \leq \hat{d}^+ \\ I_1(\tilde{p}_1) = I_1(x_o - (1-s) \cdot \hat{d}^+, y_o), & \text{otherwise.} \end{cases} \quad (16)$$

Process 4b) If the holes are not obviously caused by geometric occlusion, i.e., when $|\tilde{d}(p_o)\hat{d}^+(p_o)| \leq \delta$, the method relies on a simple color hypothesis testing to select between $I_0(\tilde{p}_0)$ and $I_1(\tilde{p}_1)$, as derived in eq. (16), for the hole filling. The basic idea is that the newly filled pixel values should ideally be consistent with its supporting neighbors in color. This type of the hole $p_o$ is filled as follows, $$I_s(p_o) = \begin{cases} I_0(\tilde{p}_0), & \text{if } |I_0(\tilde{p}_0) - \hat{I}^-(p_o)| \leq |I_1(\tilde{p}_1) - \hat{I}^+(p_o)| \\ I_1(\tilde{p}_1), & \text{otherwise.} \end{cases} \quad (17)$$

Process 5) For the holes belonging to the image border regions, the disparities of reliable contiguous pixels are simply extended into the undefined holes. We adjust the width of border regions in proportion to the baseline distance between $I_0$ and $I_1$.

Thanks to the proposed adaptive view synthesis method, the final synthesized image quality is noticeably enhanced, compared with the linearly interpolated image. Since this adaptive processing is only applied to a sparse set of pixels, it can be accelerated by exploiting the early Z-culling mechanism supplied by modern GPUs. When executing Process 4a, the method can also adaptively replace the initial disparity estimate $d_S(p_o)$ with $\tilde{d}(p_o)$ or $\hat{d}^+(p_o)$. This results in a refined disparity map $D^*_S$. The quality of the refined disparity map $D^*_S$ is visually improved over the initial map $D_S$. Even so, $D^*_S$ is not necessarily more accurate than $D_S$, with regard to the quantitative Middlebury stereo measures [27]. The reason is that adaptive view synthesis is rather designed to generate plausible images, but not directly optimized for high disparity accuracy. This is consistent with the notion of stereo for IBR [3], and using prediction error as the quality metric [13].

Fast View Synthesis Based on Forward Warping

When more than one intermediate view is requested from the same stereo pair, the adaptive view synthesis approach needs to perform disparity estimations multiple times, equal to the number of the requested views. This requirement makes real-time free viewpoint synthesis difficult on weak GPUs, which are not powerful enough or need computational resources also for other tasks. In view of this application scenario, the method also can integrate an alternative forward warping method [5] for rapid view synthesis in our IBR system as an embodiment of the present invention. Instead of requiring stereo reconstruction for each requested intermediate viewpoint s, the forward warping method relies on the synthesized center image $I_{0.5}$ and its refined disparity map $D^*_{0.5}$ for high-speed intermediate view synthesis. More specifically, the method first synthesizes a color image $I_{0.5}$ for the center viewpoint (s=0.5) using the adaptive view synthesis method. Meanwhile, a refined disparity map $D^*_{0.5}$ is obtained as the scene geometry interpretation. Next, based on $D^*_{0.5}$, the forward warping method projects the generated center view $I_{0.5}$ to any desired intermediate viewpoint s, where s≠0.5. In such a way, the novel view synthesis (and rendering) is now decoupled from the disparity estimation (as stereo matching is only performed once at the center viewpoint), hence this method leads to a significant speedup.

Due to the per-pixel based forward projection, there are undefined holes remaining in the destination image. The method can use a simplified neighborhood weighting method to interpolate the missing disparity values for the holes. Then, the holes are appropriately filled by the disparity-compensated pixels from either the left image $I_0$ (for 0<s<0.5) or the right image $I_1$ for (0.5<s<1).

To avoid the depth-sorting based visibility checking, the forward warping method has been implemented in an occlusion-compatible warp order, i.e., occluded background pixels are progressively overwritten by the occluding foreground pixels.

Systematic Optimization on the GPU

Besides the architecture-aware stream-centric algorithm design, a number of optimizations can be systematically applied to the IBR system, which is fully implemented on a GPU. This optimization process can greatly boost the real-time computation speed, resulting in a global synergy between algorithms and implementations on the GPU. Concerning the optimization schemes deployed, they can roughly be categorized into two groups: 1) the method explicitly exploits the GPU's massively parallel processors and its internal vector data representation for general high-performance computation, and 2) the method delicately utilizes hardware-accelerated graphics-oriented primitives inherent in a GPU, and optimizes the implementation of some algorithmic operations in a highly efficient manner.

Figure 8:
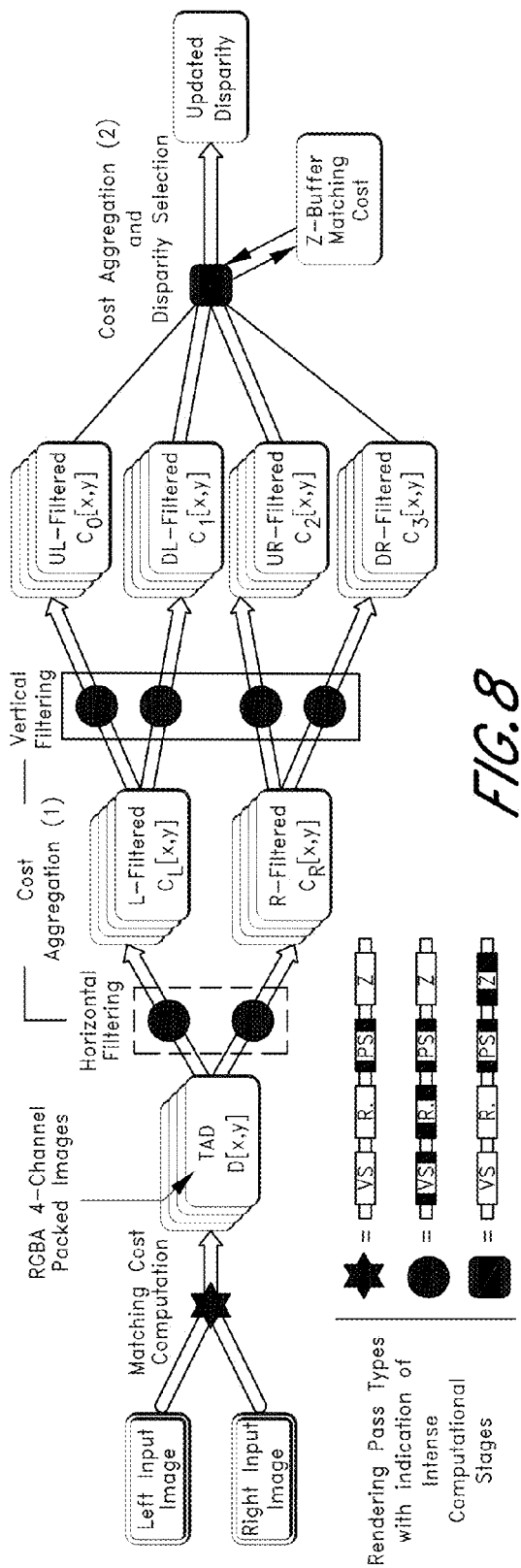
FIG. 8 shows an optimized implementation of the stream-centric stereo matching algorithm on the GPU in accordance with an embodiment of the present invention. Rasterizer, pixel shader, and vertex shader are abbreviated to R., PS, and VS, respectively in the plot.

For GPU rendering pipeline and GPGPU techniques, readers are referred to [17] for more discussion. Primary optimization schemes are provided collectively in groups. FIG. 8 exemplifies the optimized implementation of the stream-centric stereo matching method on the GPU.

Exploiting Parallel Processors of Streaming Architecture

Four-Channel Vector Processing

To maximize data-level parallelism, the GPU's efficient 4-channel processing can be exploited to compute four disparity hypotheses at a time and store the matching costs into different color channels (refer to FIG. 8). Consequently, to search over L disparity hypotheses, only ⌈L/4⌉ loops are needed.

Stream Subdivision

To avoid the inner static branch penalty in the fragment processing [17], the method first divides the stream (a texture-sized quad) into three substreams (one center quad plus two border quads), when performing adaptive view synthesis. Then, different stream kernels are applied to these substreams, so a more coherent stream processing takes place for each of them.

Optimizing Intermediate Data Type

For the high-speed streaming data storage and access, we store all the intermediate results in a 8-bit per-channel texture format, though fragment processors perform internal computation in 32-bit floating point numbers. In addition, since the TAD is adopted as the matching cost measure, the associated threshold □ can be used to adequately scale the dynamic range of the aggregated cost. Hence, the reported quality degradation due to the limited data precision [10] is significantly reduced.

Multiplexing Intermediate Storage

To increase the efficiency of vector processing in eq. (15), the computer based method stores the estimated disparity map $D_S$ into the alpha channel of the linearly interpolated color image $I_S$. Multiplexing the same alpha channel with $D_S$, the photometric outlier map $O_S$ is embedded as well, i.e., whenever $d_s(x,y)=2$, this signals $o_s(x,y)=1$, because the maximum disparity value (after scaling up to fit the 8-bit grayscale range) is always less than 255.

Exploiting Inherent Hardware-Accelerated GPU Primitives
Render-to-Texture

As an important acceleration scheme, the advanced Render-to-Texture technique in Direct3D can be adopted, eliminating the overhead of copying intermediate results from the frame buffer to textures.

Multiple Render Target

The method preferably optimizes the single-input multiple-output horizontal and vertical convolutions in FIG. 8, with the advanced Multiple Render Target technique of Direct3D. For instance, both $C_0(x,y)$ and $C_1(x,y)$ can simultaneously be derived from one rendering pass as (12) indicates, where the common input stream $C_L(x,y)$ (i.e., the texture storing left-horizontal filtering results) is loaded only once and sampled in a texture cache-friendly manner.

Z-Test

The built-in depth test (or Z-test) is preferably enabled to accelerate the cost-sorting based WTA disparity selection, as in Yang et al.'s implementation [10].

Early Z-Culling

Since the proposed adaptive postprocessing (Processes 1 to 5 in Adaptive View Synthesis for Photometric Outlier Handling above) only needs to be applied to a rather sparse set of holes $\{x_0, y_0\}$ the early Z-culling [17] as an optimized graphics hardware mechanism can be adopted. It rapidly rejects the masked-off pixels according to the computation masks $O_S$, so the redundant complexity can be largely avoided for the reliable pixels where $o_s(x,y)=0$.

Bilinear Texture Lookup

Exploiting the built-in bilinear texture lookup capability in the GPU, the method can approximate the 1D truncated SA-LAP filtering (with a kernel size of w) by $(\tilde{w}1)/2$ bilinear texture lookups and one nearest texture sampling, plus the weighted summations within one rendering pass.

Texture Coordinate Interpolators

When the center of an elementary window $W_i$ moves spatially, the absolute coordinates of its support pixels also vary. Because the rasterizer on a GPU contains parallel dedicated texture coordinate interpolators, we shift the computation of support pixels' coordinates from pixel shaders to vertex shaders and the rasterizer, accelerating this computation by dedicated hardware.

Experimental Results and Discussions

The proposed IBR system has been implemented with the Microsoft Direct3D API and the high-level shader language (HLSL). HLSL is used to program parallel vertex processors and fragment processors, with the latter being the cornerstones of the high-speed stereo on GPUs nowadays. The optimized implementation runs on an NVIDIA GeForce 7900 GTX graphics card with 512 MB video memory, housed in a 3.2 GHz PC with 1 GB main memory.

The experiments are based on the rectified stereo images from the benchmark Middlebury stereo database [27]. It contains diversified stereo datasets with ground truth, featuring different parallax and occlusions. The parameters used in the stereo matching method and view synthesis algorithm are listed in Table 1, and their values are set constant across all experiments on different stereo datasets. Among these parameters, γ controls the fall-off rate of the Laplacian kernel, and it can be further tuned to achieve the optimal quality for a particular pair of stereo images. In fact, the real-time GPU implementation facilitates this parameter fine-tuning. τ and λ are subject to the noise intensity and non-Lambertian effects, and they can be adapted to cope with other stereo images not in the Middlebury datasets. Advantageously, the proposed algorithm appears to be fairly insensitive to the rest parameter settings.

TABLE 1

Parameters for our stereo matching and view synthesis

| Stereo matching parameters | | | | | View synthesis parameters | | |
|---|---|---|---|---|---|---|---|
| γ | n | τ | α | β | λ | ε | $uj \in J = \{2, 4, 6\}$ |
| 5.0 | 33 | 80 | 0.04τ | 0.02τ | 20 | 0.0001 | $\exp(-j/\gamma)$ |

Accuracy and Throughput of Dense Stereo Matching

The disparity estimation quality of the proposed approach as been determined using the benchmark Middlebury stereo database [27]. The quantitative results of the stereo method according to one embodiment and those of some other methods roughly in descending order of performance in Table 2. The numbers in Table 2 represent error rates, i.e., the percentage of "bad" pixels whose absolute disparity error is greater than 1. The error rates are reported separately for all pixels ("all"), pixels in untextured regions ("untex.", except for the Map image), and pixels near depth discontinuities ("disc."). Table 2 shows that the local area-based approach according to one embodiment outperforms the shiftable windows (i.e., SSD+MF [5]) with 441 (21×21) support windows for each pixel, and it is also better than some stereo methods using global optimization technique (e.g., scanline optimization [5]). Compared to the previous GPU-based local stereo methods (marked with a star in Table 2), the method shows a favorable performance for all sorts of regions (nonocc., untex., and disc.).

As a comparison, the results are reported of a simplified variant (4-window) to the stereo method proposed here, relying on the four corner patterns in FIG. 4(*f-i*). This 4-window variant [18] preserves the accuracy at depth discontinuities, but the error rates for the untextured regions are doubled, lacking of a versatile set of variable windows for different image regions.

TABLE 2

Quantitative evaluation results for the original benchmark Middlebury stereo database [27]. Blank fields are not reported.

| | Tsukuba | | | Sawtooth | | | Venus | | | Map | |
|---|---|---|---|---|---|---|---|---|---|---|---|
| Algorithm | all | untex. | disc. | all | untex. | disc. | all | untex. | disc. | all | disc. |
| Stoch. diff. [28] | 3.95 | 4.08 | 15.49 | 2.45 | 0.90 | 10.58 | 2.45 | 2.41 | 21.84 | 1.31 | 7.79 |
| Our method* | 4.33 | 5.48 | 15.95 | 1.69 | 0.82 | 8.74 | 5.88 | 12.11 | 12.49 | 0.74 | 9.99 |
| SSD + MF [5] | 5.23 | 3.80 | 24.66 | 2.21 | 0.72 | 13.97 | 3.74 | 6.82 | 12.94 | 0.66 | 9.35 |

TABLE 2-continued

Quantitative evaluation results for the original benchmark
Middlebury stereo database [27]. Blank fields are not reported.

| Algorithm | Tsukuba | | | Sawtooth | | | Venus | | | Map | |
|---|---|---|---|---|---|---|---|---|---|---|---|
| | all | untex. | disc. | all | untex. | disc. | all | untex. | disc. | all | disc. |
| Gradient-guide* [11] | 4.91 | 5.86 | 12.60 | 2.38 | 2.82 | 7.92 | 9.43 | 19.39 | 20.71 | 1.24 | 9.96 |
| Ours (4-window)* [18] | 6.23 | 9.20 | 14.90 | 2.42 | 3.12 | 9.29 | 11.82 | 26.49 | 9.99 | 0.74 | 9.81 |
| Seanline Opt. [5] | 5.08 | 6.78 | 11.94 | 4.06 | 2.64 | 11.90 | 9.44 | 14.59 | 18.20 | 1.84 | 10.22 |
| Dynamic Prog. [5] | 4.12 | 4.63 | 12.34 | 4.84 | 3.71 | 13.26 | 10.10 | 15.01 | 17.12 | 3.33 | 14.04 |
| MIP* [9] | 7.07 | — | — | 10.4 | — | — | 13.3 | — | — | 2.33 | — |
| AW4* [10] | 9.68 | — | — | 5.79 | — | — | 15.7 | — | — | 0.91 | — |

The superscript *. indicates local stereo methods implemented in real-time on GPUs.

Table 3 shows the quantitative evaluation results for the new Middlebury stereo database, which includes more challenging stereo images. A comparison is provided of the proposed method with five local stereo approaches implemented on GPUs, which have been carefully optimized and evaluated in Wang et al.'s recent performance study [29]. The method according to one embodiment is highly ranked among these real-time local stereo methods on GPUs, yielding competitive disparity results for homogeneous regions and depth discontinuities. Though it is slightly outperformed by the adaptive-weight method [29], a speedup factor is achieved of about three for the same test stereo images. Two times speedup is observed over the boundary-guided method [29]. In general, disparity maps as determined by methods of one embodiment are smooth and discontinuity-preserving.

Quality and Speed of Adaptive View Synthesis

As the ultimate goal of the proposed IBR system is plausible intermediate view synthesis, the method has applied the proposed adaptive view synthesis method to the Middlebury stereo images [27]. More specifically, as Sawtooth, Venus, Teddy, and Cones datasets contain 8 viewpoints with equal spacing, the second and sixth frames were used from each set as the input stereo pairs $\{I_0 I_1\}$. For the five-frame Tsukuba dataset, the second and fourth frames were used. The center image $I_{0.5}$ was synthesized, and compared against the ground-truth image. Highly plausible images were generated by the proposed adaptive view synthesis method according to one embodiment, and they closely resemble the ground-truth counterparts with only minor errors visible in difference maps.

TABLE 3

Quantitative evaluation results for the new benchmark Middlebury stereo
database [27]. A method according to one embodiment is compared
to several recent local stereo methods using a WTA strategy, optimized and
evaluated on the GPU by Wang et al. [29]

| Algorithm | Tsukuba | | | Venus | | | Teddy | | | Cones | | |
|---|---|---|---|---|---|---|---|---|---|---|---|---|
| | nonocc | all | disc | nonocc | all | disc | nonocc | all | disc | nonocc | all | disc |
| Adaptive-weight [29] | 2.27 | 3.61 | 11.2 | 3.57 | 4.61 | 19.8 | 10.9 | 18.8 | 23.2 | 5.92 | 14.3 | 13.8 |
| Our method | 4.33 | 6.06 | 15.2 | 5.88 | 6.87 | 12.5 | 13.6 | 20.6 | 25.3 | 6.88 | 14.9 | 16.0 |
| Boundary-guided [29] | 3.88 | 5.88 | 15.0 | 7.12 | 8.34 | 26.6 | 13.7 | 21.4 | 25.4 | 11.7 | 20.4 | 20.9 |
| Oriented-rod [29] | 5.68 | 7.77 | 14.8 | 16.6 | 17.8 | 25.5 | 22.1 | 29.4 | 29.8 | 24.0 | 31.6 | 28.1 |
| Shiftable-window [29] | 4.46 | 6.03 | 15.7 | 10.9 | 11.9 | 11.0 | 17.9 | 24.6 | 27.1 | 15.8 | 22.9 | 24.3 |
| Square-window [29] | 5.13 | 7.11 | 23.2 | 9.18 | 10.3 | 35.4 | 16.9 | 24.5 | 34.0 | 9.94 | 18.9 | 20.8 |

To evaluate the execution speed on the GPU, the well-established measure has been adopted of million disparity estimation per second (Mde/s) [10-12]. The number of Mde/s corresponds to the product of image resolution, disparity search range, and the obtained frame-rate. For instance, for a stereo dataset with 320×240 pixels and 20 disparity levels, achieving 10 frames per second leads to a throughput of 320×240×20×10=15.3 Mde/s. This disparity estimation throughput measurement is more meaningful than the frame-rate, because the image resolution and the disparity search range are inclusively captured by Mde/s. Completely running on an NVIDIA GeForce 7900 GTX graphics card, the optimized implementation achieves about 480~600 Mde/s. This is much faster than Yang et al.'s method at 289 Mde/s [10], Gong et al.'s method at 117 Mde/s [11], and 50 Mde/s on the CPU and the GPU obtained by Wang et al.'s method [12].

TABLE 4

Quantitative quality measurement of the synthesized center image
$I_{0.5}$, and real-time execution speed of the stereo matching
$T_D$ and adaptive view synthesis $T_I$ (including $T_D$)
according to one embodiment

| Stereo | Size × Disp. | PSNR | $T_D$ | $T_I$ | $1/T_I$ |
|---|---|---|---|---|---|
| Tsukuba | 384 × 288 × 32 | 30.59 dB | 8.3 ms | 8.5 ms | 118 fps |
| Sawtooth | 434 × 380 × 20 | 33.11 dB | 7.9 ms | 8.2 ms | 122 fps |
| Venus | 434 × 383 × 20 | 35.21 dB | 7.1 ms | 7.8 ms | 128 fps |
| Teddy | 450 × 375 × 60 | 31.39 dB | 21.2 ms | 22.7 ms | 44 fps |
| Cones | 450 × 375 × 60 | 27.78 dB | 21.3 ms | 22.8 ms | 44 fps |

Table 4 presents the quantitative quality measurement of the synthesized center images $I_{0.5}$ in PSNR. In general, the proposed adaptive view synthesis method leads to an objective PSNR value of more than 30 dB, except for the Cones with subtle scene geometry. The stereo matching and view synthesis speed measured on the GPU is also shown in Table 4. $T_D$ denotes the execution time of estimating a dense disparity map based on the proposed stereo method, including the overhead to download stereo images and read-back the estimated map. $T_I$ is the overall execution time to adaptively synthesize one intermediate image, including the stereo matching time $T_D$. The adaptive view synthesis method achieves over 110 fps for the Tsukuba, Sawtooth, and Venus stereo images, and about 44 fps for the most demanding Teddy and Cones datasets on the GPU.

When compared to the existing stereo-based IBR systems, the proposed system in accordance with one embodiment has achieved a fairly good trade-off between the synthesized image quality and computational complexity, under the real-time constraint on the GPU. The proposed algorithm has a significant real-time speed advantage over the completely offline IBR algorithms developed by Fitzgibbon et al. [14], and Zitnick and Kang [3], while visual synthesis artifacts can still be effectively removed. Compared with fast stereo and synthesis algorithms, the proposed IBR system yields convincingly better disparity estimation results and synthesized images than Yang et al.'s approach [4], Geys et al.'s approach [15], Huang and Dubois' approach [22], and Zhang's approach [30]. At the same time, the method has a speedup factor ranging from several times to more than two orders of magnitude over the previous methods [4, 15, 22, 30], thanks to the highly efficient IBR algorithm, specifically designed and optimized on the GPU.

Computational Complexity Profiling of the IBR System

Figure 9:
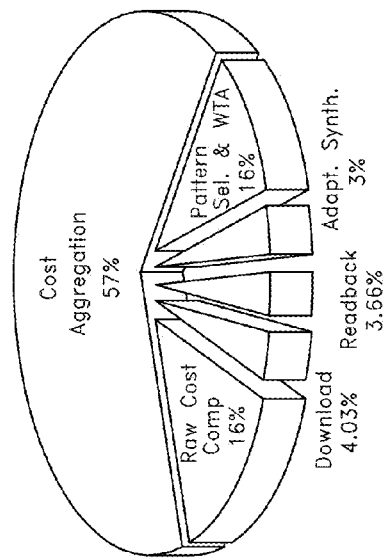
FIG. 9 shows complexity profiling of building blocks in a proposed IBR system in accordance with an embodiment of the present invention.

To have a comprehensive idea of the system workload distribution, the computational complexity of each individual IBR component has been measured. FIG. 9 shows the complexity profiling of the building blocks in the IBR system, based on the Teddy stereo images with 60 disparity levels. The most time-consuming part is the cost aggregation process in stereo matching, consuming about 57% of the overall processing time. This observation closely matches the expectation of local stereo methods, with a typical emphasis on the reliable cost aggregation process [29]. Also, this is conceptually similar to the case of motion estimation in a video encoder. As the cost aggregation method according to one embodiment only demands regular 1D convolutions, the proposed design leads to massive parallelism and significant acceleration on the GPU. The profiling result also justifies the efficiency of the proposed adaptive view synthesis method, consuming only about 3.2% of the overall complexity. Without excessive overdesign for any particular building block, the end-to-end optimized IBR system according to one embodiment achieves a global synergy, attaining the design goal of real-time plausible view synthesis.

Quality-Complexity Scalability in the IBR System

Figure 10:
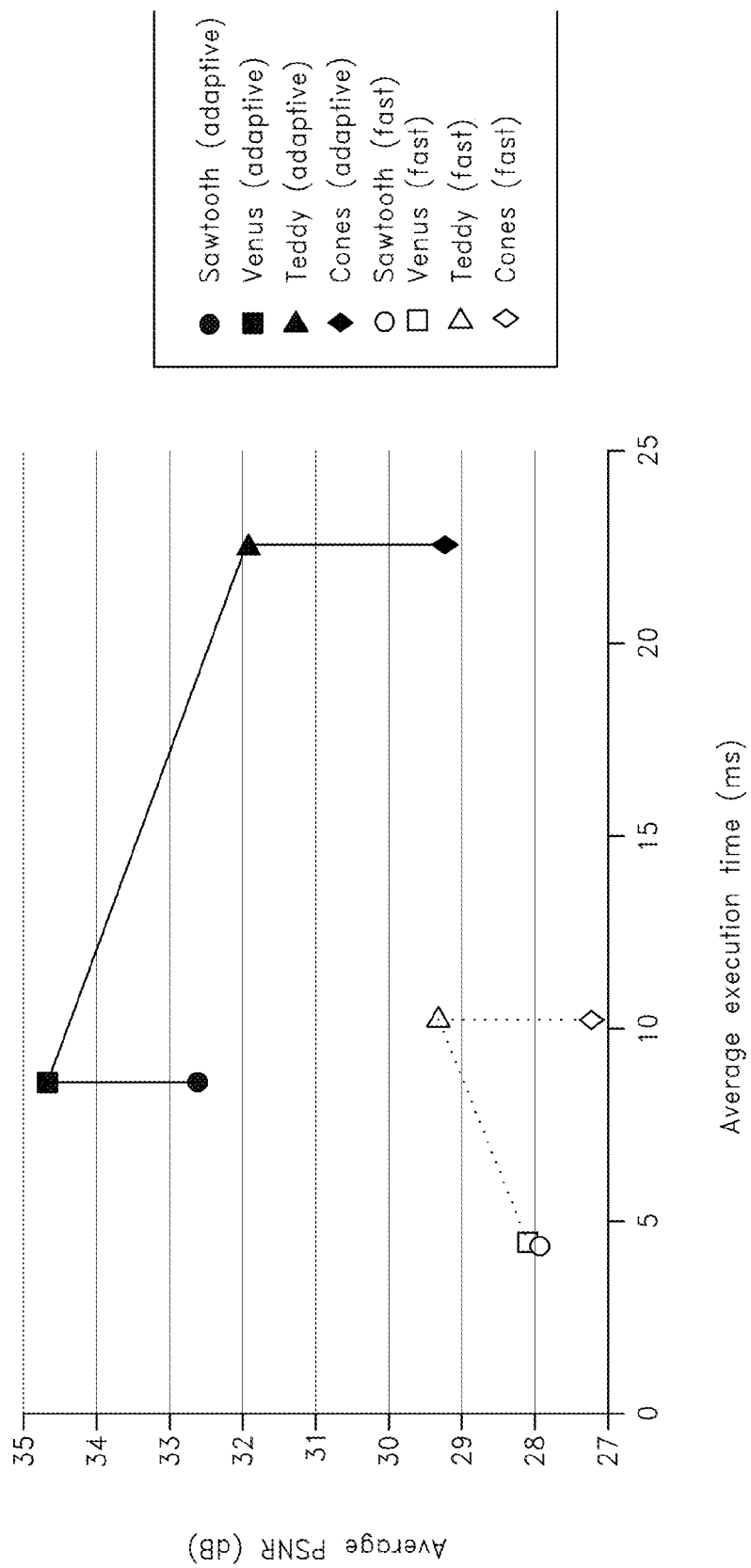
FIG. 10 shows average PSNR values versus average overall execution time for two alternative view synthesis methods, tested on four stereo datasets.

To evaluate the quality-complexity scalability provided by the proposed IBR system, intermediate view synthesis was performed with the quality mode and the speed mode respectively for the viewpoints s=0.25 and 0.75. The real camera images at these viewpoints are also supplied by the Middlebury stereo website [27]. FIG. 10 shows the average quality of the synthesized images at these two viewpoints versus the average overall execution time (including the averaged disparity estimation time). When switching between two proposed view synthesis modes, a two-fold speedup is measured on average for different stereo datasets, though at 2 to 6 dB PSNR loss. the measurement shows that as more intermediate views are requested, the speedup factor approaches 7[21]. This embedded scalability makes the IBR system according to one embodiment easily adaptable to both powerful and weak GPUs.

A visual comparison of synthesized Venus images using two optional modes, when s=0.25 has been made. Despite two PSNR values having a gap of 7 dB, the perceptual quality of the image generated with the fast view synthesis mode does not drop significantly. In fact, the synthesis errors primarily appear at intensity edges in the difference map. Due to the masking effects, only some of these synthesis errors cause obvious perceptual artifacts, such as those along characters, where the plausible rendering requirement is not satisfied.

Figure 11:
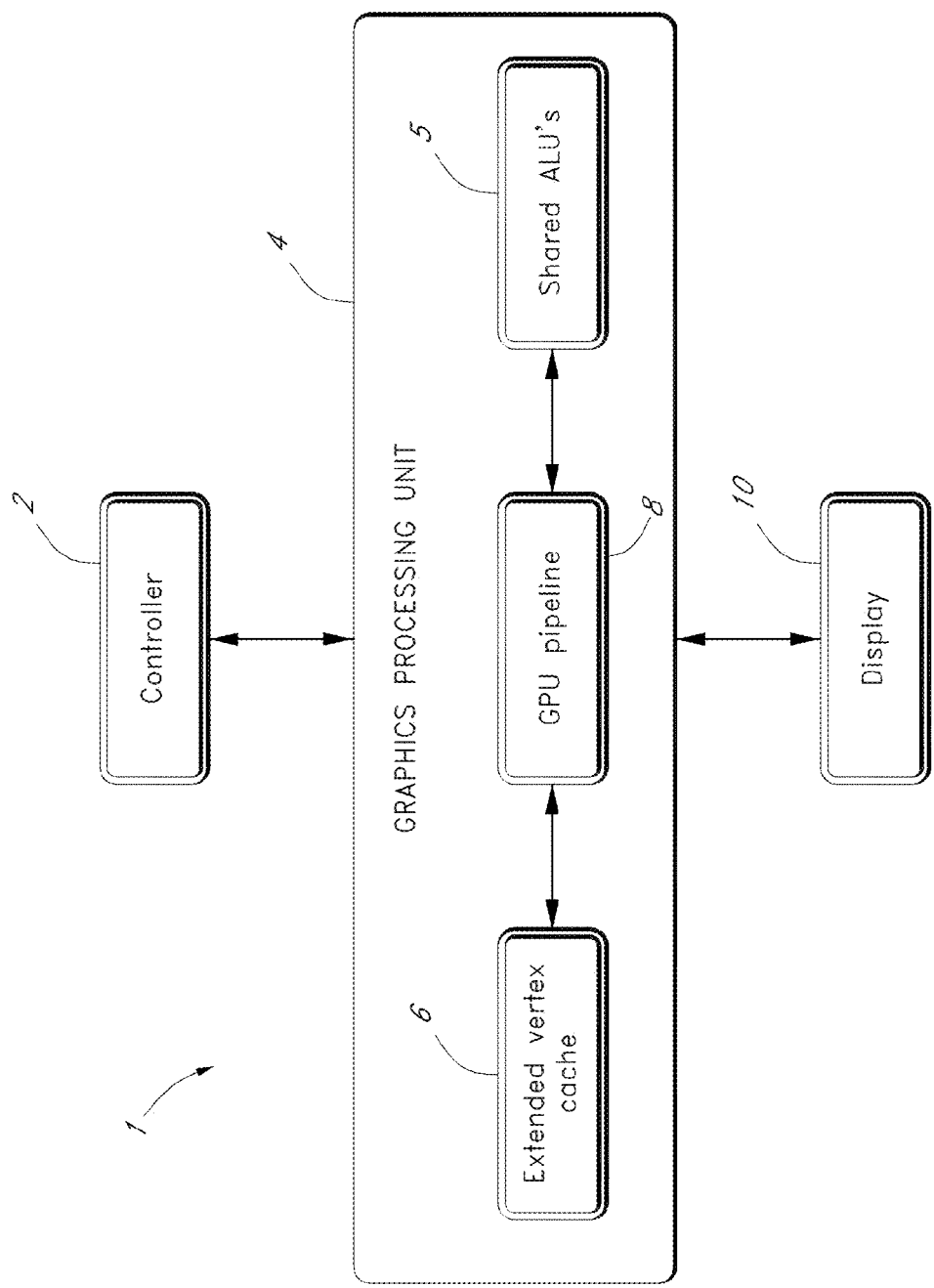
FIG. 11 is a schematic view of a GPU for use with one embodiment.

FIG. 11 is a block diagram illustrating a computer apparatus 1 including a graphics processing unit (GPU) 4 that includes a GPU pipeline 8 for processing computerized images that may be used with one embodiment. The GPU pipeline 8 can optionally make use of one or more shared arithmetic logic units (ALUs) 5 to improve efficiency in the image processing. In addition, GPU pipeline 8 may optionally implement an extended vertex cache 6 in order to reduce the amount of data propagated through GPU pipeline 8. Alternatively, the stages of GPU pipeline 8 may be arranged in accordance with other known GPU pipelines, which are able to do image processing in accordance with the methods of one embodiment. Computer apparatus 1 may include a controller 2, the GPU 4 and a display 10 and optionally an image capturing device (not shown).

Computerized video images to be processed by GPU 4 may be obtained from a remote device or from a local device, such as a video server that generates video or video objects, or a video archive that retrieves stored video or video objects or from an image capturing device, e.g. a video camera.

Controller 2 controls operation of GPU 4. Controller 2 may be a dedicated controller for GPU 4 to specifically carryout the methods of one embodiment or may be a more general controller that controls the overall operation of device 1. GPU 4 receives image data, e.g. two images for processing in accordance with one embodiment from controller 2. The image data may correspond to representations of N-dimensional e.g. two-dimensional or three-dimensional real camera images or computerized graphics. GPU 4 processes the image data in accordance with any of the methods described herein. The images may be formed as video frames in a sequence of video frames. Display 10 may be any suitable display such as liquid crystal display (LCD), a cathode ray tube (CRT) display, a plasma display, a projector, a plotter a printer etc.

The pipeline 8 within GPU 4 can include several stages, including a vertex shader stage, several primitive setup stages, such as triangle setup and Z-Gradient setup, a rasterizer stage, a primitive rejection sages, an attribute gradient setup stage, an attribute interpolation stage, and a fragment shader stage, etc. More or fewer stages may be included.

CONCLUSION

Certain embodiments provide an end-to-end performance optimized IBR system, specifically designed for real-time plausible view synthesis on GPUs. The key contributions are manifold. From an algorithm perspective, the method uses a variable center-biased windowing approach for reliable stereo matching across different image regions. Adaptive view synthesis method is then proposed to effectively tackle visual artifacts, based on a photometric outlier map derived rapidly. When multiple intermediate views are desired, the method provides an even faster view synthesis option using a forward warping scheme. From an implementation standpoint, all the building blocks in the IBR system have been designed for the maximum data-level parallelism, and this stream-centric design paradigm has led to a significant acceleration on the GPU. Furthermore, a number of delicate optimizations have been applied to boost the real-time performance. Experimental results show that the proposed IBR system is capable of synthesizing plausible intermediate images at state-of-the-art high speed, measured on an NVIDIA Geforce 7900 GTX graphics card. When porting the implementation to an NVIDIA 8800 GT graphics card (the mainstream desktop card as of 2007), one observed an average speedup factor of 2.4 over the speed figures reported in the paper, without making any changes.

In particular, certain embodiments include a locally adaptive scheme that assigns a spatially varying Laplacian fall-off rate γ for different image regions. This provides, as much finer pixel-wise aggregation strength is regulated in this case, an improved performance for stereo datasets with subtle scene structures, e.g., tips of cones and chopsticks in the Cones images. Certain embodiments also include an IBR system with enforcement of temporal consistency to reduce flickering artifacts between successive synthesized frames.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

REFERENCES

[1] H. Shum, S.-C. Chan, and S. B. Kang, *Image-based rendering*. Springer, 2006.
[2] C. L. Zitnick, S. B. Kang, M. Uyttendaele, S. Winder, and R. Szeliski, "High-quality video interpolation using a layered representation," in *Proc. of SIGGRAPH'04*, Los Angeles, Calif., August 2004, pp. 600-608.
[3] C. L. Zitnick and S. B. Kang, "Stereo for image-based rendering using image over-segmentation," *Int'l Journal of Computer Vision*, vol. 75(1), pp. 49-65, October 2007.
[4] R. Yang, G. Welch, and G. Bisop, "Real-time consensus-based stereo reconstruction using commodity graphics hardware," in *Proc. of Pacific Graphics*, Beijing, China, October 2002, pp. 225-234.
[5] D. Scharstein and R. Szeliski, "A taxonomy and evaluation of dense two-frame stereo correspondence algorithms," *Int. Journal of Computer Vision*, vol. 47, pp. 7-42, May 2002.
[6] A. Fusiello, V. Roberto, and E. Trucco, "Efficient stereo with multiple windowing," in *Proc. of CVPR,* 1997, pp. 858-863.
[7] O. Veksler, "Fast variable window for stereo correspondence using integral images," in *Proc. of CVPR*, Madison, Wis., 2003, pp. 556-561.
[8] K. J. Yoo and S. Kweon, "Adaptive support-weight approach for correspondence search," *IEEE Trans. Pattern Anal. Mach. Intell.*, vol. 28, pp. 650-656, 2006.
[9] R. Yang and M. Pollefeys, "Multi-resolution real-time stereo on commodity graphics hardware," in *Proc. of Conference on Computer Vision and Pattern Recognition,* 2003, pp. 211-218.
[10] R. Yang, M. Pollefeys, and S. Li, "Improved real-time stereo on commodity graphics hardware," in *Proc. of CVPRW*, June 2004.
[11] M. Gong and R. Yang, "Image-gradient-guided real-time stereo on graphics hardware," in *Proc. of 3DIM*, Ottawa, June 2005, pp. 548-555.
[12] L. Wang, M. Liao, M. Gong, R. Yang, and D. Nister, "High-quality real-time stereo using adaptive cost aggregation and dynamic programming," in *Proc. of 3DPVT,* 2006.
[13] R. Szeliski, "Prediction error as a quality metric for motion and stereo," in *ICCV,* 1999, pp. 781-788.
[14] A. Fitzgibbon, Y. Wexler, and A. Zisserman, "Image-based rendering using image-based priors," in *ICCV,* 2003, pp. 1176-1183.
[15] I. Geys, T. P. Koninckx, and L. V. Gool, "Fast interpolated cameras by combining a GPU based plane sweep with a max-flow regularisation algorithm," in *Proc. of 3DPVT*, Greece, September 2004, pp. 534-541.
[16] M. D. McCool, "Signal processing and general-purpose computing on GPUs," *IEEE Signal Process. Mag.*, vol. 24, pp. 109-114, 2007.
[17] J. D. Owens, D. Luebke, N. Govindaraju, M. Harris, J. Krüger, A. E. Lefohn, and T. J. Purcell, "A survey of general-purpose computation on graphics hardware," *Computer Graphics Forum*, vol. 26, no. 1, pp. 80-113, 2007.
[18] J. Lu, S. Rogmans, G. Lafruit, and F. Catthoor, "Real-time stereo correspondence using a truncated separable Laplacian kernel approximation on graphics hardware," in *Proc. IEEE Int'l Conf. Multimedia and Expo,* 2007, pp. 1946-1949.
[19] J. Lu, G. Lafruit, and F. Catthoor, "Fast variable center-biased windowing for high-speed stereo on programmable graphics hardware," in *Proc. IEEE Int'l Conf. Image Process.,* 2007, pp. 568-571.
[20] J. Lu, S. Rogmans, G. Lafruit, and F. Catthoor, "High-speed stream-centric dense stereo and view synthesis on graphics hardware," in *Proc. IEEE Int'l Workshop on Multimedia Signal Process.,* 2007, pp. 243-246.
[21] S. Rogmans, J. Lu, and G. Lafruit, "A scalable end-to-end optimized real-time image-based rendering framework on graphics hardware," in *Proc. 3DTV Conference,* 2008.
[22] X. Huang and E. Dubois, "Disparity estimation for the intermediate view interpolation of stereoscopic images," in *ICASSP,* 2005, pp. 881-884.
[23] A. Mancini and J. Konrad, "Robust quadtree-based disparity estimation for the reconstruction of intermediate stereoscopic images," in *Proc. of SPIE Stereoscopic Displays and Virtual Reality Systems*, vol. 3295, 1998, pp. 53-64.
[24] H. Hirschmuller, P. Innocent, and J. Garibaldi, "Real-time correlation-based stereo vision with reduced border errors," *Int. Journal of Computer Vision*, vol. 47, pp. 229-246, 2002.
[25] D. Scharstein, "Stereo vision for view synthesis," in *CVPR,* 1996, pp. 852-858.
[26] J. Sun, Y. Li, and S. B. Kang, "Symmetric stereo matching for occlusion handling," in *CVPR* (2), 2005, pp. 399-406.
[27] Middlebury stereo vision page. http://www.middlebury.edu/stereo.

[28] S. H. Lee, Y. Kanatsugu, and J.-I. Park, "MAP-based stochastic diffusion for stereo matching and line fields estimation," *Int. Journal of Computer Vision*, vol. 47, pp. 195-218, 2002.

[29] L. Wang, M. Gong, M. Gong, and R. Yang, "How far can we go with local optimization in real-time stereo matching," in *Proc. of 3DPVT*, 2006.

[30] L. Zhang, "Fast stereo matching algorithm for intermediate view reconstruction of stereoscopic television images," *IEEE Trans. Circuits Syst. Video Technol.*, vol. 16, pp. 1259-1270, 2006.

What is claimed is:

1. A computer-based method of computing a disparity value of a pixel, the method comprising:
   inputting two input images;
   computing from the input images a plurality of first costs for the pixel using a computing device, each cost being associated with a region of a first type selected from a plurality of regions of the first type, the regions of the first type being overlapping with and including the pixel, the regions being substantially equal in size and shape;
   computing from the first costs for the pixel a plurality of second costs, each cost being associated with a region of a second type of a plurality of regions of the second type, the regions of the second type being overlapping with and including the pixel, at least some of the regions of the second type having a substantially different size and/or shape;
   selecting from the second costs a minimal cost; and
   selecting a corresponding disparity value as the disparity value.

2. The method of claim 1, wherein the second costs are normalized with the size of the region of the second type.

3. The method of claim 1, wherein a penalty is added to the second costs to implement bias to regions of the second type with larger sizes.

4. The method of claim 1, wherein the first costs are a sum of absolute differences of pixel values from the input images, computed over the region of a first type.

5. The method of claim 1, wherein the first costs are computed on the input images after filtering with a center-biased two-dimensional (2D) filter.

6. The method of claim 5, wherein the filtering is applied in two subsequent processes of applying one-dimensional (1D) filters, each filter oriented in another direction.

7. The method of claim 5, further comprising:
   filtering in at least a first and a second dimension of the at least one pixel of at least two images; and
   detecting the depth information from the at least one pixel of the at least two images.

8. The method of claim 7, wherein the process of filtering in at least a first and a second dimension of the at least one pixel of at least two images is performed with Laplacian kernels comprising a per pixel adaptable weighting parameter.

9. The method of claim 8, wherein the Laplacian kernels are derived from multi dimensional separable Laplacian kernels based on the Manhattan distance metric and the per pixel adaptable weighting parameter comprises the geometric proximity to the at least one pixel.

10. The method of claim 7, further comprising filtering parts of the at least two images with an approximated kernel, wherein the parts of the at least two images are at least partially overlapping.

11. The method of claim 10, wherein the parts of the at least two images comprise at least one combined pixel and the filtering of parts of the at least two images is performed for the at least one combined pixel.

12. A computer-readable medium having stored thereon instructions configured to cause a computing device to perform the method of claim 1.

13. A method of determining depth information from at least one pixel in a movie, the method comprising:
   capturing at least two scenes with at least one image capturing unit and with at least one viewpoint on the at least two scenes; and
   computing a disparity value of a pixel from the two scenes captured according to the method of claim 1.

14. A method of image synthesis at a predetermined viewpoint from two input images, the method comprising:
   obtaining disparity values according to the method of claim 1 for a plurality of pixels;
   creating the image by view-dependent linear interpolations;
   determining ambiguous portions in the created image; and
   correcting the ambiguous portions in the created image by exploiting disparity information from nearby unambiguous portions in the created image.

15. A device for computing a disparity value of a pixel, comprising:
   a receiving unit configured to receive two input images;
   a first computing unit configured to compute from the input images a plurality of first costs for the pixel, each cost being associated with a region of a first type selected from a plurality of regions of the first type, the regions of the first type being overlapping with and including the pixel, the regions being substantially equal in size and shape;
   a second computing unit configured to compute from the first costs for the pixel a plurality of second costs, each cost being associated with a region of a second type of a plurality of regions of the second type, the regions of the second type being overlapping with and including the pixel, at least some of the regions of the second type having a substantially different size and/or shape;
   a first selecting unit configured to select from the second costs a minimal cost; and
   a second selecting unit configured to select a corresponding disparity value as the disparity value.

16. The device of claim 15, wherein the device is adapted for determining depth information from at least one pixel in a multi view multimedia application, the device further comprising:
   a filtering unit configured to filter in at least a first and a second dimension of the at least one pixel of at least two images; and
   a detecting unit configured to determine the depth information from the at least one pixel of the at least two images.

17. An image processing system comprising at least one device according to claim 16, further comprising at least one image capturing unit.

18. The device of claim 16, wherein the filtering unit comprises Laplacian kernels that comprise a per pixel adaptable weighting parameter.

19. The device of claim 16, further comprising a second filtering unit that comprises an approximated kernel configured to filter at least one combined pixel that is part of the at least two images.

20. A device for computing a disparity value of a pixel, comprising:

means for receiving two input images;

means for computing from the input images a plurality of first costs for the pixel, each cost being associated with a region of a first type selected from a plurality of regions of the first type, the regions of the first type being overlapping with and including the pixel, the regions being substantially equal in size and shape;

means for computing from the first costs for the pixel a plurality of second costs, each cost being associated with a region of a second type of a plurality of regions of the second type, the regions of the second type being overlapping with and including the pixel, at least some of the regions of the second type having a substantially different size and/or shape;

means for selecting from the second costs a minimal cost; and means for selecting a corresponding disparity value as the disparity value.

* * * * *